United States Patent
Cope et al.

(10) Patent No.: US 8,862,491 B2
(45) Date of Patent: Oct. 14, 2014

(54) SYSTEM AND METHOD FOR CREATING AND EXPRESSING RISK-EXTENDED BUSINESS PROCESS MODELS

(75) Inventors: Eric W. Cope, Langnau am Albis (CH); Lea A. Deleris, White Plains, NY (US); Dominik Etzweiler, Hergiseil (CH); Jana Koehler, Oberrieden (CH); Jochen M. Kuester, Zurich (CH); Bonnie K. Ray, Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 1644 days.

(21) Appl. No.: 12/354,481

(22) Filed: Jan. 15, 2009

(65) Prior Publication Data
US 2010/0179847 A1    Jul. 15, 2010

(51) Int. Cl.
G06Q 10/00 (2012.01)
G06Q 10/06 (2012.01)
G06F 11/07 (2006.01)
G06F 9/44 (2006.01)
G06Q 40/08 (2012.01)

(52) U.S. Cl.
CPC .......... *G06Q 10/0635* (2013.01); *G06F 11/079* (2013.01); *G06F 8/10* (2013.01); *G06Q 10/0633* (2013.01); *G06Q 10/067* (2013.01); *G06Q 10/06311* (2013.01); *G06Q 40/08* (2013.01)
USPC .......... 705/7.28; 705/7.27; 705/322; 717/117

(58) Field of Classification Search
CPC ......... G06F 8/10; G06F 11/079; G06Q 10/06; G06Q 10/067; G06Q 10/0635; G06Q 30/0222
USPC ........................................................ 705/1.1
See application file for complete search history.

(56) References Cited

U.S. PATENT DOCUMENTS

| | | | | |
|---|---|---|---|---|
| 6,065,009 A | * | 5/2000 | Leymann et al. | 1/1 |
| 7,818,421 B2 | * | 10/2010 | Machida | 709/224 |
| 7,895,470 B2 | * | 2/2011 | Nastacio et al. | 714/25 |
| 2001/0021913 A1 | * | 9/2001 | Leymann et al. | 705/7 |

(Continued)

OTHER PUBLICATIONS

Xie Kefan; Liu Jieming; Chen Yun, (2007). A Theoretical and Empirical Analysis of Risk Management in Business Process, Wireless Communications, Networking and Mobile Computing, 2007. WiCom 2007. International Conference on , vol., No., pp. 6509,6512, Sep. 21-25, 2007.*

(Continued)

*Primary Examiner* — Brett Feeney
(74) *Attorney, Agent, or Firm* — Scully, Scott, Murphy & Presser, P.C.; Daniel P. Morris, Esq.

(57) ABSTRACT

A method and computer program product for integrating risk management concepts into a standard business process metamodel by defining a set of metamodel extensions to standard process modeling languages that incorporate risk information directly in the process model. The method includes collecting risk-relevant information for addition to a business process model, and enabling visualizing of a risk-extended business process model. using a notation to express notions as failure modes of resources, root cause events, and sources of execution failure and low job output quality directly in the context of process models. Additionally, the method enables the computation of risk-related impacts on the distribution of process performance measures using a Bayesian network model or a discrete-event simulation model.

13 Claims, 16 Drawing Sheets

(56) References Cited

U.S. PATENT DOCUMENTS

| | | | |
|---|---|---|---|
| 2003/0167182 A1* | 9/2003 | Bloom et al. | 705/1 |
| 2005/0044197 A1* | 2/2005 | Lai | 709/223 |
| 2008/0120129 A1* | 5/2008 | Seubert et al. | 705/1 |
| 2008/0154679 A1* | 6/2008 | Wade | 705/7 |
| 2008/0249646 A1* | 10/2008 | Alse | 700/104 |
| 2008/0288433 A1* | 11/2008 | Nores et al. | 706/47 |
| 2009/0019310 A1* | 1/2009 | Nastacio et al. | 714/26 |
| 2009/0276257 A1* | 11/2009 | Draper et al. | 705/7 |
| 2010/0110933 A1* | 5/2010 | Wilcock et al. | 370/255 |
| 2010/0114618 A1* | 5/2010 | Wilcock et al. | 705/7 |

OTHER PUBLICATIONS

M. zur Muehlen and M. Rosemann, B. Integrating risks in business process models,[ in Proc. 16th ACIS, Sydney, Australia, Nov. 30-Dec. 2, 2005.*

Ray et al., (2008). Integrating risks in business process models. IBM Research Report. Apr. 14, 2008. 1-18. Available at: http://domino.research.ibm.com/library/cyberdig.nsf/papers/B910FD4421357445852574340005349F4/$File/rc24534.pdf.*

Tjoa et al., "Enhancing Business Impact Analysis and Risk Assessment Applying a Risk-Aware Process Modeling and Simulation Methodology", The Third International Conference on Availability, Reliability, and security (ARES 2008), pp. 179-186, downloaded on Oct. 28, 2008 from IEEE Xplore.

Cheng et al., "Modeling operational risk in business processes", Journal of OPerational Risk, vol. 2, No. 2, Summer 2007 (2007); 73-98.

Neiger et al., "Integrating Risks in Business Process Models with Value Focused Process Engineering", {\em Proceedings of the 2006 European Conference on Information Systems (ECIS 2006)}, Goteborg, Sweden, Jun. 12-14, 2006.

zur Muehlen et al., "Integraing Risks in Business Process Models", Proceeedings of the 16th Australasain Conference on Information Systems (ACIS 2005), Sydney, Nov. 30-Dec. 2, 2005.

Object Management Group, Business Process modeling Notation, V1.1. OMG Document Number: formal/2008-01-17, OMG, 2008.

* cited by examiner

100

| | | |
|---|---|---|
| 102 | ⬭ | STATE / ACTIVITY / TASK |
| 104 | ▱ | JOB |
| 106 | ⌭ | RESOURCE |
| 108 | ⬠ | PERFORMANCE MEASURE |
| 110 | ⬭ | ENVIRONMENTAL FACTOR |
| 112 | ✚ | MITIGATION ACTION |
| 114 | ✦ | RISK EVENT |
| 116 | ↺ | STATE CHANGE EVENT |
| | 👁 | INSPECTION EVENT |
| | → | SEQUENCE FLOW / STATE TRANSITION CONNECTION |
| 120 | ⇢ | CAN CAUSE / CAN AFFECT / INSPECTS / MODIFIES RELATIONS |

SYSTEM AND METHOD FOR CREATING AND EXPRESSING RISK-EXTENDED BUSINESS PROCESS MODELS

FIELD OF THE INVENTION

The present invention relates generally to risk management generally, and more particularly, to methods and utilities for modeling risk information, such as risk information in the context of a business.

BACKGROUND OF THE INVENTION

Business process models have become a ubiquitous tool for documenting, designing, and managing the core functions of an enterprise. The range of information that can be represented in process modeling software toolkits has steadily expanded beyond simple workflow representations to include information regarding process objectives and measures of process performance, oversight and control policies, and supporting resources. By representing these concepts in a standardized framework, business process models provide managers with insight and a common language to describe how their businesses operate and how they provide value to their customers and stakeholders.

Business process models are also seen as an integral tool for corporate governance and risk management. For many companies, process modeling has also become a legal requirement after the passage of regulatory legislation such as the Sarbanes-Oxley (SOX) Act. Such laws were passed in the wake of the accounting scandals and financial industry crises of the early 2000's, with a primary aim of ensuring that companies would enact the proper controls to reduce their operational risks. Other regulations, such as the Basel II accords, additionally require firms to measure and hold reserves against their operational risk exposures.

Currently, however, most risk management and quantification techniques are at best only loosely coupled with process modeling. Risk management techniques such as Failure Mode and Effect Analysis (FMEA) use business process models as a starting point for identifying and locating possible risk exposures, but do not document the risks themselves in the process models, or, use the process model relations explicitly in quantifying risks. To date, there have been few efforts made to formally integrate risk management concepts into a standard business process metamodel. For example, no standardized notation has emerged to express such notions as failure modes of resources, root cause events, and sources of execution failure and low job output quality directly in the context of process models.

Business process models represent the activities and participants that contribute to the achievement of specific value-generating objectives of a firm. Operational risks are a set of threats that jeopardize the achievement of those objectives. Current standards and frameworks for risk management require that business process models be used in order to help identify and assess various operational risks.

Currently, however, the metamodels that define the vocabulary of business process models do not include a sufficient vocabulary to capture and express all information that is relevant to identifying and quantifying operational risks.

Thus, it would be highly desirable to provide a system and method that addresses the need for more effective modeling of risk information in the context of business processes.

It would further be desirable to provide a system and method for extending the execution semantics of standard business process modeling languages in order to simulate the effects of risk events within business processes.

SUMMARY OF THE INVENTION

The present invention provides a system, method and computer program product that addresses the need to integrate risk management concepts into a standard business process metamodel by defining a set of metamodel extensions to standard process modeling languages that incorporate risk information directly in the process model.

A system and method is also provided that enables the constructing of graphical business process models that represents operational risk information in the context of business processes wherein a data model is described as an extension of a business process modeling notation.

In a farther aspect, a system, method and computer program product is provided for collecting risk-relevant information and a method to incorporate this information into business process model diagrams. This information is relevant to the identification and quantification of risks and their effects on process objectives.

Further to these aspects, there is defined a set of extensions to a business modeling language, such as the Business Process Modeling Notation (BPMN) Ver. 1.1 process modeling specification standard (OMG, 2008), the content and disclosure of which is incorporated by reference as if fully set forth herein.

Thus, according to one aspect of the invention, there is provided a system, method and computer program product for generating: (1) A data model specifying the risk-related information required to populate business process models; and, (2) A method for identifying, collecting, and integrating this data within the context of business process models.

According to a her aspect of the invention, there is provided a method for representing operational risk information in a business process model, the method comprising:

receiving, at a computer device, first data defining a job type that is to be processed in a business process model, the job types having associated job attributes specifying for determining an order of activities to be performed;

receiving, at the computer device, second data for each job type, the second data specifying one or more resources and associated functions of resources that support activity execution and one or more preconditions to be fulfilled by the resources performing the functions, the second data for each job type further comprising a defined set of performance measures related to activity execution and to job output quality, the job output quality including job quality states defined according to different levels of quality;

receiving, at the computer device, third data defining a set of risk events that potentially compromise the performance measures, a risk event having assigned one or more attributes specifying risk event frequency and severity level, the set of risk events being linked to one or more resources;

receiving, at the computer device, fourth data specifying one or more preconditions for the activities in terms of requirements to be fulfilled to begin activity execution;

providing a function for each activity that maps a state of a resource, job, external factor, as well as an occurrence or non-occurrence of one or more errors, to output states of the resources and jobs and to the activity execution performance measures; and, implementing a graphical model notation for depicting, on the computer device, a business model representation extended to incorporate the first, second third and fourth data using the activity mapping function, the business model representation displayed to include representation and impact of operational risk.

Further to this aspect, in the method for representing operational risk information, the second data further includes, for each job type, a specification of variants of said job type activities or executions thereof, said second data including a correlation of available resources to said activity or execution variants.

Moreover, in the method for representing operational risk information, the second data further includes data specifying failure modes of each said one or more resources for each sad job types and specified variants thereof.

Further, in the method for representing operational risk information, the second data further specifies indicators of vulnerabilities to risk events.

Further, in the method for representing operational risk information, the fourth data further comprises: specified external factors that must be satisfied in order to begin activity execution, the external factors including environmental factors.

In a further aspect of the invention, there is provided a method for extending a business process model comprising:

specifying first elements representing performance measures and objectives of a business process which may be compromised by risk events;

specifying second elements representing contextual information describing circumstances in which the business process is executed which may be relevant to a failure mode, the contextual information comprising at least a type and state of resources required to support the business process, a type and state of jobs and artifacts that undergo the business process; and, a type and state of any influential environmental factors;

specifying third elements representing errors which may occur during process execution;

specifying fourth elements representing causal relationships among risk events related to the resources, activities, and the environmental factors that may influence process execution; and, providing a set of metamodel extensions to a standard process modeling language that incorporate the specified first second third and fourth elements directly in the business process model.

Advantageously, as a consequence, the operations risks associated with achieving business objectives can be quantified. Moreover, the system and method for extending the business models herein provide support to risk managers who must make decisions regarding investments in risk countermeasures, process reengineering, control improvements, optimal risk responses, and root cause inference.

BRIEF DESCRIPTION OF THE DRAWINGS

The objects, features and advantages of the present invention will become apparent to one skilled in the art, in view of the following detailed description taken in combination with the attached drawings, in which:

FIG. 4 depicts a key to graphical vocabulary for extended metamodel entities and relations in one example embodiment of the invention;

DETAILED DESCRIPTION OF THE PREFERRED EMBODIMENTS

Figure 1:
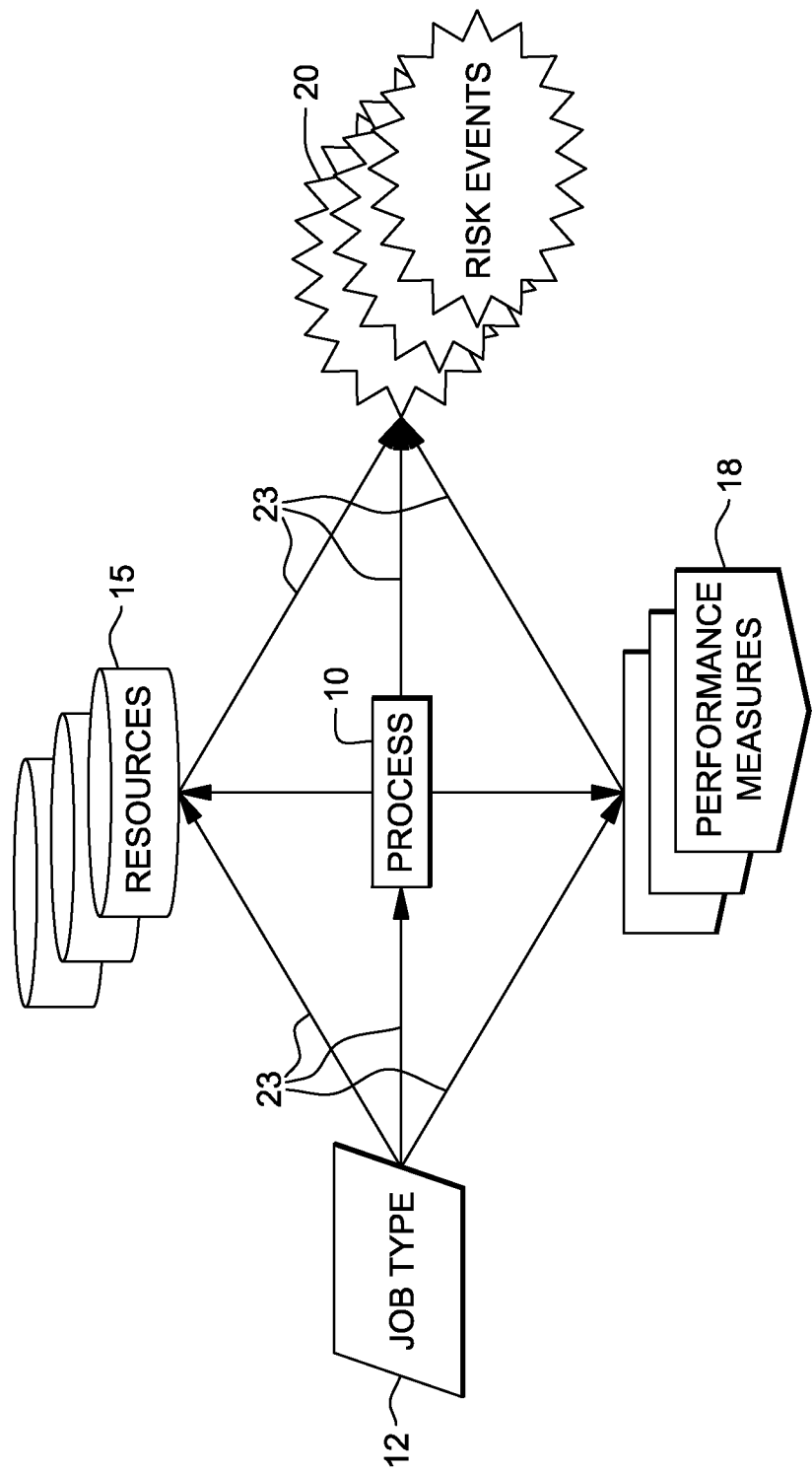
FIG. 1 is a conceptual diagram 100 depicting how contextual information relevant to operational risk is logically determined in a business data model.

The present invention provides a system and method that addresses the need to integrate risk management concepts into a standard business process metamodel by defining a set of metamodel extensions to standard process modeling languages that incorporate risk information directly in the process model.

The risk modeling language and the model extensions described herein provides structure to the process of identifying key risks. One may begin with a standard, existing process model and iteratively query on each of its component tasks, identify possible failures, drill down to determine their root causes, determine their likely effects on process performance, and ensure that remediation procedures are planned for each possible eventuality. The invention introduces a vocabulary for risk concepts and their possible relationships and combinations, and enables the creation of systematic procedures to chart causes and effects of errors.

Additionally provided by the system and method of the invention is the ability to derive quantitative models for assessing risk exposures from a properly constructed risk-extended business process model. The risk-extended process models introduce graphical nodes connected by lines that indicate relationships among model elements, in particular, cause-effect and other dependence relations. These entities and relations are directly mapped to a quantitative graphical model that is programmed for computing the risk-related impacts on the distribution of process performance measures, such as a Bayesian network or a discrete-event simulation model.

Furthermore, the risk-extended process model provides guidance on exactly what data must be collected, and from which sources, in order to estimate the parameters of a quantitative risk model.

As referred to herein "risk" is defined as events that can disrupt a business process and negatively affect performance measures such as the execution time and cost of processes, or the quality of their outputs. Risk is thus understood to include the probability of unsatisfactory outcomes of such process-related performance measures as described herein below. Process risks may therefore be regarded as an important, but by no means exhaustive, subclass of operational risks. They include such risk event types such as technology and infrastructure failures; natural disasters and public safety; and execution, delivery, and process management risks such as would typically be seen in manufacturing and service delivery environments.

Business process models provide a valuable organizing context for identifying and analyzing a broad class of operational risks, as they graphically depict the events that occur in the value-creation process. In particular, the role that different activities undertaken by the business (or by cooperating actors outside the business) play in contributing to the overall performance of the process may be viewed in accordance with the present invention. Alternatively viewed, the process model also provides an indication of how errors or failures in activities contribute to diminished process performance. Thus, the invention provides a way of understanding and visualizing how process performance may be impacted by such failures by providing further annotations to the process models than what standard process metamodels currently allows.

In an example embodiment, there is defined a set of extensions to the BPMN (Business Process Model 1.1 process modeling specification standard (OMG, 2008), the content and disclosure of which is incorporated by reference as if fully set forth herein. It is understood that the principles of the invention can be implemented in other modeling tools such as the ARIS toolset (company IDS Scheer) or, for other tools that support the BPMN modeling language. Although the development model described herein is most closely tied to the BPMN process metamodel (OMG, 2008) incorporated by reference as if fully set forth herein, the disclosure mainly focuses on elements of that model that can be found in nearly every business process metamodel, such as tasks, control flow arrows, splits, forks, joins, and merges, etc.

The defined set of extensions and expansion of the vocabulary of business process models enable the specification of explicit the dependencies between activities in the process diagrams and process risks. In doing so, further information is added on various task requirements, such as supporting resources, as well as the effects of specifically identified "risk events" that could disrupt task execution. The invention makes these relationships explicit, and provide new insights into key risk drivers such as critical resources, common vulnerabilities among resources, and cause-effect chains of failure propagation. Such relationships assist a risk manager to know better how to invest in risk countermeasures, as well as to better respond to risk incidents as they occur.

The invention includes adding to concepts constructs such as resources, jobs, and performance measures in process modeling contexts, new elements. In some cases, the information associated with each of these modeling elements may be expanded; in other cases, new elements are added, while preserving the basic interpretations and relations among these elements in each case.

In one embodiment, risks is measured in terms of process performance measures, and in one embodiment, two broad classes of performance measures are focused on. First, there is considered measures of efficiency of execution, related to measures of the time or cost it takes to complete a job. Typically with process efficiency measures, each task in the process contributes a portion of an overall performance measure. In many cases, if it is assumed that transaction prices are fixed for the customer, events that negatively impact the efficiency of execution affect the firm alone. Second, the measures of output job quality are considered, which are primarily related to the satisfaction of external parties, such as the customer receiving the finished goods, or a regulator ensuring the safety of a product. Events resulting in a low output job quality, such as the contamination by lead of paint for children's toys, may not affect process execution times or costs. The converse is also true: a manufacturer who has a parts inventory shortage may incur extra time and cost in the emergency procurement of parts in a gray market, but the quality of the finished goods may be exactly the same.

The types of risks threatening process performance are characterized into several broad categories. To understand this taxonomy, a process model is considered as an activity flow diagram, specifying an order of tasks, and each of these tasks has a set of preconditions which must be filled in order to begin the execution of the task. In one embodiment, a precondition is used to designate a set of requirements that must be fulfilled in order for an activity to begin execution. Activity post-conditions refer to the state of the job and associated resources at the completion of the activity.

In one embodiment, three classes of risk are identified to business process models:

1. Procedural errors are errors in the order in which the tasks are performed, or if tasks are performed even though certain preconditions are not fulfilled. For example, if a step in a hiring process is to check the applicant's police record, skipping this step would result in a risk that the job would be given to someone with criminal tendencies.
2. Failures in meeting activity preconditions include problems related to the unavailability or the unsuitability of necessary resources and other preconditions to begin an activity. For example, if a task requires information to be retrieved from a database the information will become unavailable if the computer is down as a result of a power outage. Task execution errors are simply mistakes that occur in the execution of a task. They might include data entry errors, machine malfunctions, and other such errors that occur once the task has begun after the preconditions have been fulfilled.

These categories may not be mutually exclusive; for example, an improperly trained computer operator's incorrect entry of application data might be classified as a failure to meet the preconditions of the task, a resource inadequacy, or simply a task execution error. The best choice for capturing most risk scenarios may depend on the overall objectives of the analysis.

As typical process models are normative in character, in that they express how a process is intended to function in an ideal sense, as opposed to a description of the actual functioning of individual process instances, a process model is meant to express a context-free template for a sequence of tasks that can be replicated at different times and places, executed by different resources, and serve the ends of different stakeholders. However, in those cases where processes fail, they do so for a variety of reasons that are often closely tied to the particular circumstances of the process execution. In addition, certain performance measures may be tied to classes of process execution instances, which may be associated with sets of circumstances. Therefore, in order to understand the mechanics of how business processes fail, further information is incorporated into the process models that specifies the particular situations and environments in which the process may be executed.

In one aspect of the invention, business process instances are contextualized through the specification of job type and resource type. Failures are specified according to risk event types. In addition, the invention takes into consideration additional determinants of context stemming from the application of mitigation actions and applied risk countermeasures, referred to herein as mitigation actions. Sets of mitigation actions may be considered as part of a decision-making framework in a risk management exercise.

In one aspect, these are included as graphical elements within the process model to document the effects these actions are to have on the structure and functioning of the process. The application of a mitigation action results in a change in the attributes of resources, jobs, activities, etc., that is intended to improve the manner in which risk events occur and impact the process. Mitigation actions may change the overall structure of the process as well, by for example adding resources, adding state inspections or other control measures, or reducing the impact on performance measures through insurance policies.

FIG. 1 depicts a conceptual diagram of how contextual information relevant to operational risk is logically determined in a business data model. First, job types determine the process, and the job and process, in turn, determine the resources and performance measures to apply, and finally each of these elements determine the relevant risk events. That is, in reference to FIG. 1, job type 12 and mitigation actions are the primary determinant of context, as these specify the processes or process variants required to complete the job. In conjunction with the process 10, the job type 12 determines the resource types 15 required, as well as the measures 18 by which performance is measured performance measures). Although not shown, mitigation actions also may determine resource types and process variants to be used in the model; they also determine the attributes of the risk events, resources, jobs, activities, etc. The process, resources, and performance measures together determine the relevant risk events 20 to be considered in the model.

The linkages 23 between the types of jobs, activities, resources, and risk events are specified by defining attributes that are linked in order to express key relationships relevant to understanding risk impacts. Attributes, in one aspect, are used for specifying associational rules that link various classes of entities in the risk-extended process model. For example, attributes are used to specify classes of resources 15 that are associated with a certain job type 12. In one example, a type of risk event may be connected with a type of resource, distinguished by location. Associational rules are provided to simplify and automate the task of defining causal dependencies between classes of entities in the model. Example relationships between these model object classes as shown in FIG. 1, and how they may be determined by attributes, is now described in greater detail:

1) Jobs 12 have attributes which determine what resources and activities are required to process the job 10, as well as a set of attributes linking them to certain performance measures. For an example of the latter, a manufacturer may want to ensure, for each individual customer, that the time from order to delivery meets a given deadline with high probability. Each order made by each customer must be tracked in order to determine if the quality of service targets are met; this can be done by assigning customer attributes to the various jobs flowing through the process model.

2) Each activity in a process 10 may be linked to certain types of performance measures. In addition, each activity is associated with a set of functional roles that broadly specify the types of resources that may play that role. The job type, in addition to the functional role, provides a full specification the information necessary to define the appropriate resource types to support any given activity instance.

3) Resources 15 have attributes which allow them to be linked to certain job types and to various functional roles of activities, but they also have attributes which link them to each other, as well as link them to certain risk events that can take place. For example, resources can depend on one another, such as a computer application may rely upon a certain server on which it is installed to be up and running. A similar type of relation occurs when one resource is composed of other resources, e.g., the various components that make up a computer system.

4) Risk events 20 may affect resources and jobs of a certain type. For example, the appearance of a security vulnerability might compromise all the computer resources running a certain version of a certain operating system.

By the linking 23 of risk events to resources, resources to other resources, resources to activities and jobs, and activities and jobs to performance measures, the attributes allow mapping generic causal chains or chains of influence from root causes to final impacts. Attributes are thus critical elements of the risk model as they help to identify failure types that may occur repeatedly for a large class of job instances and resources. How these chains are described in terms of the mechanics of the causal relationships are modeled through job and resource states and state changes.

By introducing resources into the process model, objects are introduced which can persist beyond process completion, and affect future process instances. Thus, a failed resource can affect many process instances. In order to capture repeated failures, states are assigned which correspond to failure modes of the resource. The failure mode of a resource can be linked to task execution errors, or may cause activity preconditions to fail to obtain. The state of the resource can influence activity time and cost, as well as job output quality. All persistent task execution failures as the result of a resource being in a failure mode are modeled; that is, failure modes for activities are per se not explicitly modeled. Therefore, all task execution failures are understood as affecting a single process instance only. Unlike attributes, it is assumed that states may change their value during the course of a process instance or during the lifecycle of a resource.

Another form of persistence is in the quality state of the job that is undergoing transformation in the business process. Job states can also be important in modeling the information required in, for example, a quality inspection to determine if remedial actions should be undertaken to repair or replace a faulty job. This might be expressed in a business process model as a conditionally executed subprocess, depending on the state of the job at the moment of arriving at a decision gateway. The process of identifying the failure modes, and explicitly modeling the remedial steps to be taken when certain failure modes are discovered, allows a business to estimate how quickly and effectively it can respond to certain threats.

In many cases, states are not directly observable by the actors involved with managing or executing the process, and delays in the detection of failure modes can greatly increase the severity of their impact. For this reason, standard FMEA practice requires the probability of detection or length of time before discovery to be explicitly modeled to compute the severity index. In one example, in metamodel extensions, it is assumed that states of resources and jobs are observed at certain points, such as activity preconditions or decision points which explicitly refer to the failure modes of resources or the incoming job. In addition, certain inspection events are designated, which may be triggered at regular intervals, or with the occurrence of other events.

In addition to jobs and resources, there may be other variables that are not under the control of the business which influence the performance measures of time, cost, and job quality. These environmental factors may include market data such as exchange rates and commodity prices, or the state of regulations that determine whether completed jobs are compliant or noncompliant. Like jobs and resources, environmental factors have persistent states that can influence the states of jobs and resources within the firm, or the performance measures directly.

Event Logic

Causal chains of failure are built from the interaction of specific events that are associated with the business process. A conceptual model is provided for formally identifying and relating the various events which may occur. The BPMN specification already includes a number of events, such as process starts and completions, as well as intermediate events occurring within the process flow, including error occurrences, message transmissions among process participants, timed sequence flows, etc. In addition to these events, three more event types are added which are specific to risk modeling and are closely bound to the states of jobs, resources, and environmental variables 1) Risk events are "original disruptions" or "root causes" which cause the state of one or more resources or jobs to go into a failure mode, or which directly cause an task execution failure. Risk events may be classified according to attributes, and may occur with a given frequency and severity. Often, risk events are events that impact the system from outside the scope of the defined entities and interactions in the model, and are explicitly under study in the model to determine their overall impacts.

2) State change events are simply changes in the failure modes of jobs and resources (or the return of a job or resource from a failure mode to a "normal" mode). State changes may be triggered by risk events, or by other state changes. For example, the change in state of an electricity supply from "available" to "unavailable" may cause the state of a computer that is reliant upon that power to also change from "available" to "unavailable."

3) Inspections involve the complete or partial discovery of the failure mode of a job, resource, or environmental factor. As described above, an inspection can be triggered by a risk event, a state change, a job arrival to an activity or decision gateway (if the job or resource state is explicitly referenced in the activity preconditions or decision criteria). While the change of state and the observation of the state change are logically independent events, they are often closely linked with each other and need not be modeled separately. Inspections may also be independent events that may be regularly scheduled. When tied to a decision node, a decision can trigger the conditional execution of a sub-process that leads to remediation of a failure mode in a job or resource.

An important difference between risk events and what BPMN terms as "intermediate events" is that they do not necessarily occur within the process flow. The present invention accommodates risk events within the BPMN metamodel as a new event class, since they originate from or occur to entities that are outside the process flow. However, state change and inspection events are considered as intermediate events.

Risk Metamodel Specification

Definitions of the elements, states, attributes, events, and relationships required for risk-extended business process modeling are now described within the context of the BPMN specification, e.g., BPMN V.1.1 specification (OMG, 2008) the whole description and contents of the is incorporated by reference as if fully set forth herein. FIGS. 7-12 depict example UML class diagrams of the BPMN specification that are extended and indicate how existing BPMN notation is one embodiment for use in capturing many of these elements; these extensions to BPMN are provided herein in an example embodiment.

Each of the risk modeling elements herein described further indicate how they inter-relate, and how they are to be represented within the BPMN framework:

Process. In the risk-extended model, processes do not only include those events, activities, and flows that occur between the start of a job and its completion, but also link these elements to resources and environmental factors, which may persist across several process instances.

Resources and environmental factors are treated as process participants, and associate each resource and environmental factors with a process of its own, which maps the possible evolution of state transitions as a state diagram. In addition, each process is associated with various job types which are eligible to undergo the process, as well as performance measures and risk events related to those performance measures.

As described above, which resources, environmental factors, performance measures, and risk events play a role in any given process instance depends on the job type of the job to be processed, as well as any applied mitigation actions.

Figure 2:
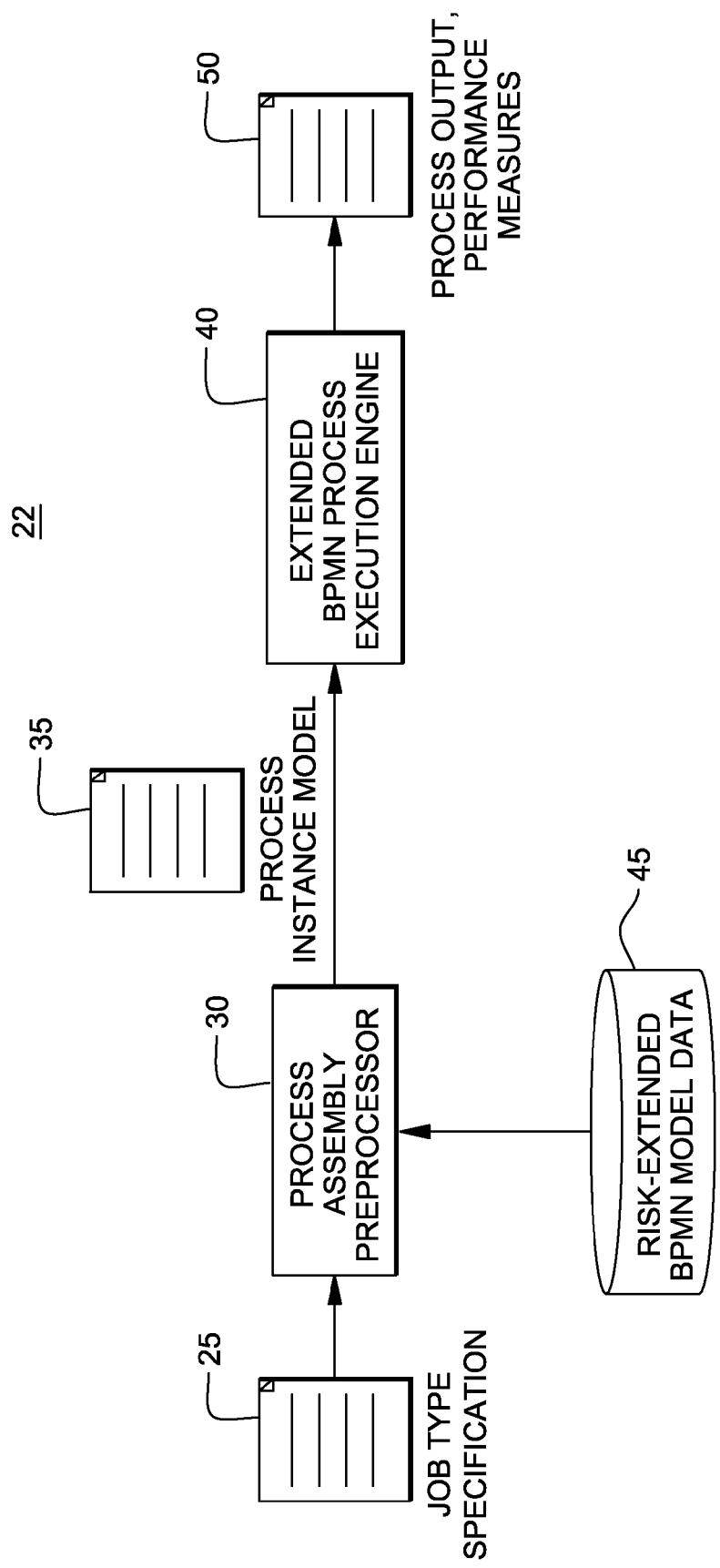
FIG. 2 depicts an example system 22 for generating the business process model output and performance measures impacted by operational risk according to the invention.

As shown in FIG. 2, this can be realized by adding a preprocessing phase 30 to a (BPMN) process execution engine 40 that constructs the process instance based on the job type specification 25. FIG. 2 particularly depicts an example system 22 for generating the process output 50 (e.g., performance measures). The diagram of FIG. 2 emphasizes the role of a process assembly pre-processor 30 executing programmed instructions for pre-processing an input job type specification 30 to construct a process instance model 35 based on the incoming job type specification 25 including any mitigation action(s), and resource(s), environmental factor(s), performance measure(s), and risk event(s) as stored in the risk-extended BPMN data stored in memory storage device, e.g., database 45, according to the logic as in FIG. 1. The overall process instance and the attributes of the various artifacts and activities are then assembled from these component parts, with the flows and associations between lie elements determined by a set of predetermined rules. Finally, the data object representing the job is initialized, and the process instance 35 begins executing in the extended process (e.g., BPM) execution engine 40. In addition, in the preprocessing phase 30, it is possible that variants of the sequence flow of the process are assigned that correspond to procedural errors, such as skipped tasks or tasks performed out of order. These variants may be assigned at random according to a predefined probability distribution; this distribution is allowed to conditionally depend on the state values of any artifacts that are current at the time of assignment.

Thus, in accordance with a modified BPMN (e.g. V. 1.1) specification, in one embodiment of the invention, the "Business Process Diagram" Attributes are extended to include the following attributes:

| Attributes | Description |
|---|---|
| Jobs (1-n): Job | A BPD SHALL allow one or more types of jobs to be processed. |
| MitigationActions (0-n): MitigationActions | A BPD MAY allow mitigations actions to be specified which determine variants of the process and supporting artifacts. |
| BPDElementSets (1-n): BPDElementSet | The element sets define, for each job, a set of pools, artifacts, and connecting object elements. These elements define the processes, resources, environmental factors, mitigation actions, performance measures, risk events that make up the business process diagram for a particular job type, as well as the connectors that link these objects. |
| AssignmentRules (1-n): Expression | The assignment rules attribute is an expression that specifies for each job and mitigation action a corresponding BPD Element Set. |

Activity. Activities are modeled largely according to the BPMN standard, with a few modifications to allow relationships with jobs, performance measures, resources, and environmental factors, as well as to more precisely model their execution semantics in cases of failures.

Figure 3:
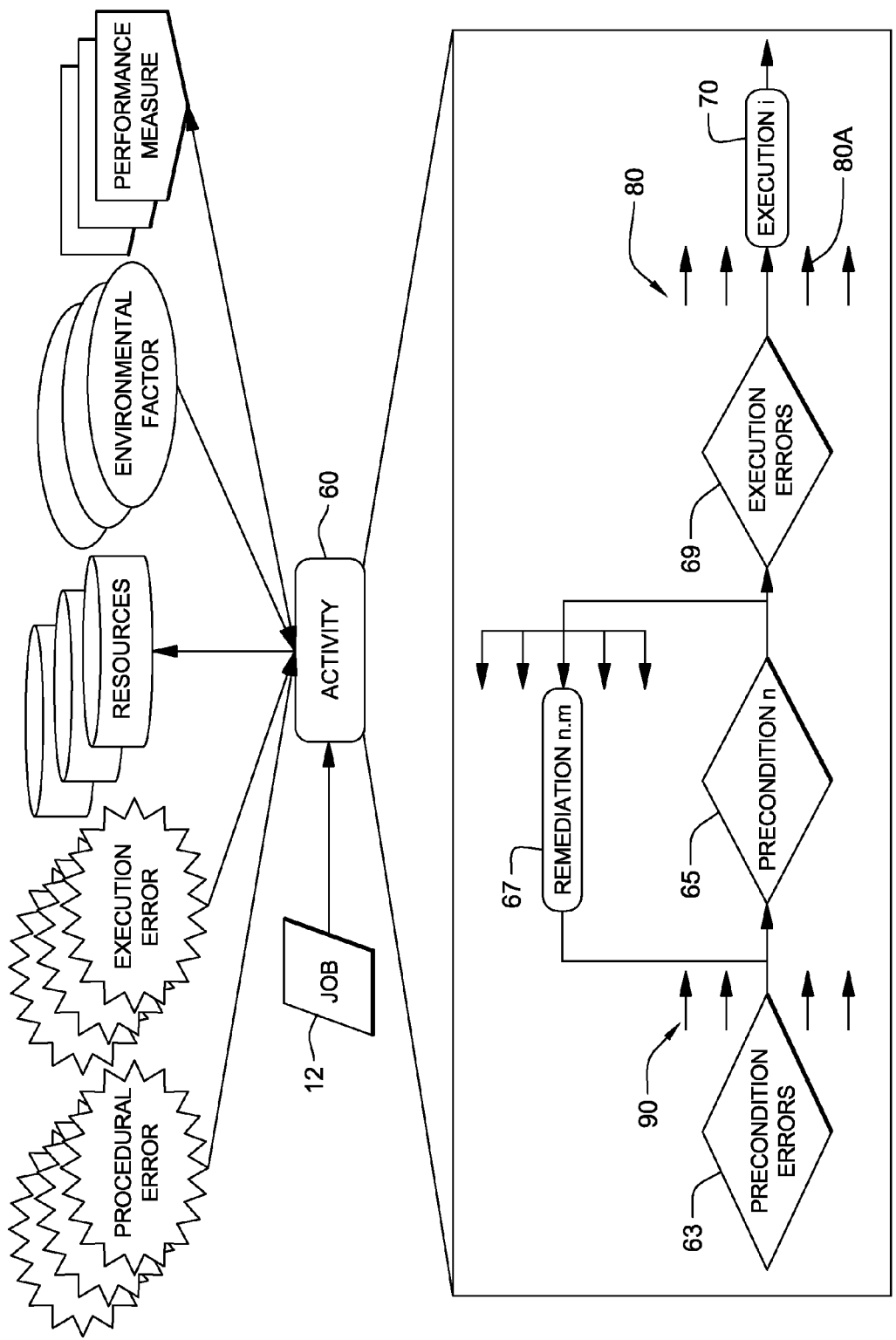
FIG. 3 is a schematic depiction of business process model activity semantics modified to show how an activity affects, and is affected by, the metamodel elements defined in accordance with the invention.

The BPMN activity semantics are modified as shown in FIG. 3 which shows how an activity 60 affects, and is affected by, the metamodel elements defined herein, including jobs 12, resources 15, procedural 17 and execution errors 63, environmental factors 23, and performance measures 20. The relationships between these elements and the activity are expressed in an example embodiment in FIG. 3. FIG. 3 also shows how activities can be broken into subcomponents corresponding to preconditions, execution, remediation, and procedural and execution errors. Particularly, how activities may be affected by procedural or execution errors, the availability of resources, the quality of resources and jobs, and the states of environmental factors. They can in turn affect the quality of resources and jobs, and the outcomes of performance measures. If desired, one can break activities up into subcomponents corresponding to precondition checking and execution. The failure of pre-conditions to hold can lead to the undertaking of alternative remediation actions. Procedural and execution errors are represented as branches leading to alternative precondition checks and varieties of execution.

As shown in FIG. 3, an activity 60 is triggered by the arrival of a token or data object (representing a job) 12 and begins with a verification that certain preconditions n are fulfilled, where n is a dummy index of the various preconditions 65 that may be specified. If these preconditions are fulfilled, then the activity 60 is executed 70, where the execution outcomes may be influenced by execution failure events, as well as the states of the data object (representing a job), the supporting resources, and various environmental factors. If the preconditions are not met, then the activity may be delayed or it may be cancelled, or certain remedial steps 67 may need to be performed in order to ensure that execution can finally begin. That is, in FIG. 3, each detected precondition error 63 would lead to a separate set of defined preconditions (labeled with index precondition n); every violation of a precondition set n would lead to a remediation action 67 (sub-labeled remediation n, m), and every execution error 69 would lead to a different execution 70 of the activity (sub-labeled execution i).

With regards to BPMN activity semantics, this is realized by adding a precondition requirements check as an implicit decision gateway, with a branch leading to activity execution 70 if all requirements are satisfied, and other branches each leading to sub-processes that must be performed in order to complete the requirements check. In cases where jobs or data objects cannot wait for the preconditions to become satisfied, a branch may simply lead to an end state node to indicate that the overall process instance is cancelled, which implies that the job has been cancelled. In many cases, error and compensation events can be used within the BPMN standard to represent the handling of any such exceptions within the activity.

Activity preconditions 65 are expressed as a set of requirements on the availability and quality of resources which are to play specific functional roles in the activity execution, as well as on the states of jobs and environmental factors. The resources that are required for activity execution are determined in the preprocessing phase of constructing the process instance, which assigns a resource of an appropriate type for each functional role defined for the activity, and further meets the resource type requirements that may be specified in the job type. This is an embodiment of role-based allocation of resources (see e.g. Sienou et. al. (2007)). The triggering of a check of precondition requirements 65 implies that an inspection takes place of the states of the job and supporting resources listed in the preconditions.

The execution of the activity 70 results in a set of postconditions, which includes the job state, the state of the supporting resources, and the evaluation of certain execution-related performance measures, such as time and cost. This is an extension of the BPMN execution semantics which do not support the concept of setting the states of, e.g., resources when an activity ends its execution. Similar to usual BPMN execution semantics, activity execution may be disrupted by events, which correspond to execution failure of a certain type.

Viewed abstractly, activity execution 70 is a random function that maps input states of data objects and resources and the occurrence of execution failures to output states of those jobs and resources, along with various performance measures. If further detail or additional activity steps need to be represented to describe what happens when certain execution failures occur, the activity can in principle be replaced by a sub-process 80 that initially branches according to the type of execution failures that may occur. Each branch 80a of the subprocess is associated with a different version of the same activity, but which assigns different probabilities to the outcomes.

Further, as shown in FIG. 3, procedural errors 17 may lead to the execution of an activity even if not all the preconditions are met. Again, conditional branching 90 is used to indicate the various alternative precondition sets that could be used in place of the correct precondition set.

Within the BPMN specification, the definition of activities to accommodate the possibilities of procedural and execution errors are modified. The specification of activity preconditions is handled by specifying a set of "Input Sets" of artifacts required for activity execution, such that execution begins if one of the Input Set requirements is fulfilled. The Input Sets are mapped to a set of Output Sets of artifacts using a set of defined Input-Output Rules (I/O Rules), which indicate what artifacts the activity produces based on the artifact input. This setup can be visualized in several ways: First, information is included about the types of procedural, precondition, and execution errors that can occur. Procedural errors allow certain "improper" input sets to be considered, conditional on whether the error occurs.

Second, preconditions and postconditions may also express requirements on the states of the artifacts that they reference. Precondition violations and remediation steps that are to be performed in case of such violations may be expressed using Error Events and related exception handling notation. Next, the Input-Output Rules are modified to allow execution errors to determine the output set of artifacts to be produced on completion of the activity. The output sets further specify the possible states of those artifacts on completion, with a probability distribution defined over these states.

According to the invention, the specification of the attribute "IORules" is modified to allow the rules to map each input set and a set of execution errors to an output set. That is, if the activity is instantiated with a specified input and a set of execution errors, the activity shall complete with the specified output. The output sets include artifacts whose states may be random, where the probability distribution governing the state of the output artifact can be dependent on the set of occurring execution errors.

Thus, in accordance with a modified BPMN (e.g. V. 1.1) specification, in one embodiment of the invention, a "Common Activity" Attribute Extension includes the following:

| Attributes | Description |
| --- | --- |
| FlowObjectErrorRef (0-n): FlowObjectError | A set of Flow Object Errors MAY be specified for each activity to document procedural, precondition, or execution errors. |

Subprocess. A subprocess represents a collection of activities with a defined control flow, which are defined as a single unit. When considered as a unit, the subprocess is treated similarly as an activity, but as a collection, it is similar to a business process. The utility of a subprocess for risk modeling purposes is to introduce a compact notation for indicating that certain influencing factors, such as resource functional roles and environmental factors, may affect many or all of the component activities. Also, performance measures for subprocesses are defined, which may be functionally related to performance measures for the component activities.

Gateways. Gateways are modeled using the standard BPMN notation. In cases where gateway routing depends on the state of the job or other entities, those states become observed; i.e., there are inspection events and associated message flows linked to the gateway. In addition, procedural errors may be associated with branches; these result in a misassignment of an output path. These may be modeled by specifying the probability distribution over output branches to allow for incorrect paths to be taken. According to the extended BPMN model (e.g., V.1.1), in one aspect of the invention, the "Gates" attribute of the Gateways class is removed and replaced with the following attribute:

| Attributes | Description |
| --- | --- |
| GateSets (1-n): GateSet | A GateSet is a set of gates that may be associated with a gateway. Each GateSet represents a gateway variant that may arise as a result of procedural errors. |

State Diagram. State diagrams are used in order to describe the various states that a model artifact may take, as well as to in what manner and under what conditions those states may change. Artifacts that are described using state variables include jobs, resources, performance measures, and environmental factors. A state diagram is represented as a graph whose nodes correspond to different qualitative levels of various state variables.

Figure 11:
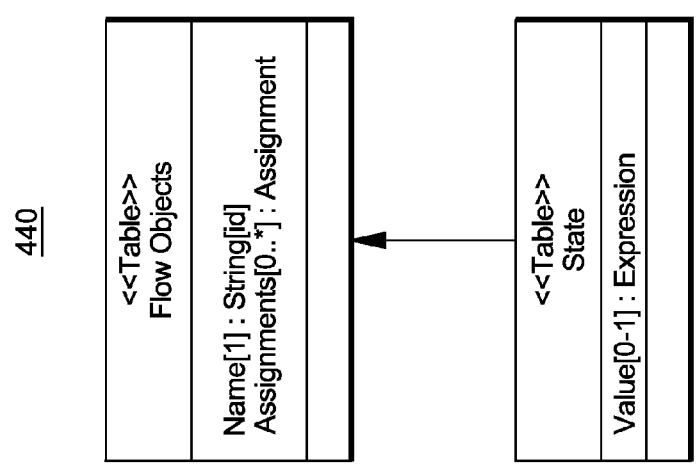
FIG. 11 depicts the extended BPMN model class diagram in which states are classed as flow objects according to an example embodiment of the invention.

A single node in the diagram may also be used to represent a state variable whose value may take many different quantitative levels. The qualitative state nodes are linked by flow objects that indicate possible state transitions. According to the extended BPMN model class diagram 440, as shown in FIG. 11, "States" are classed as flow objects having the following attributes:

| Attributes | Description |
| --- | --- |
| Value (0-1): Expression | The Value attribute MAY be used to record the state value, in the case of quantitative state levels. Qualitative state levels on the other hand are simply distinguished by the state name, and a separate state object is assigned for each qualitative level. |

The state of an artifact can change according to various events, such as risk events, state changes in other artifacts, or deliberate actions taken to improve the state of the artifact, such as maintenance on a resource or remedial work done on a compromised job. The invention provides an indication of a functional dependence between the state of the artifact and other elements of the process model using a can affect relation(s); furthermore, causal relations between events affecting states of artifacts are represented using a can cause relation(s). These relationships provide the linkages between the states of the artifacts and the functioning of the process.

State diagrams are represented similarly as business processes, reusing the notation for activities and control flow arrows for the states and state transitions. Unlike process notation, however, start and end events indicating the initial and end states of these objects at process start and completion may not be included, as the objects may be in many possible states at those times. When the process begins, and the various artifacts associated with the process are assembled in the preprocessing phase, the states of those artifacts may already be determined by their pre-existing values prior to the job arrival, or they may be assigned randomly if the model does not keep a memory of the states of artifacts outside of process execution times. In cases where the value of a certain state variable may not always be known to the process owner or participants, a further state variable with binary states is provided to indicate whether that variable is observed or not. These states will change during inspection events, as described herein below.

Figure 12:
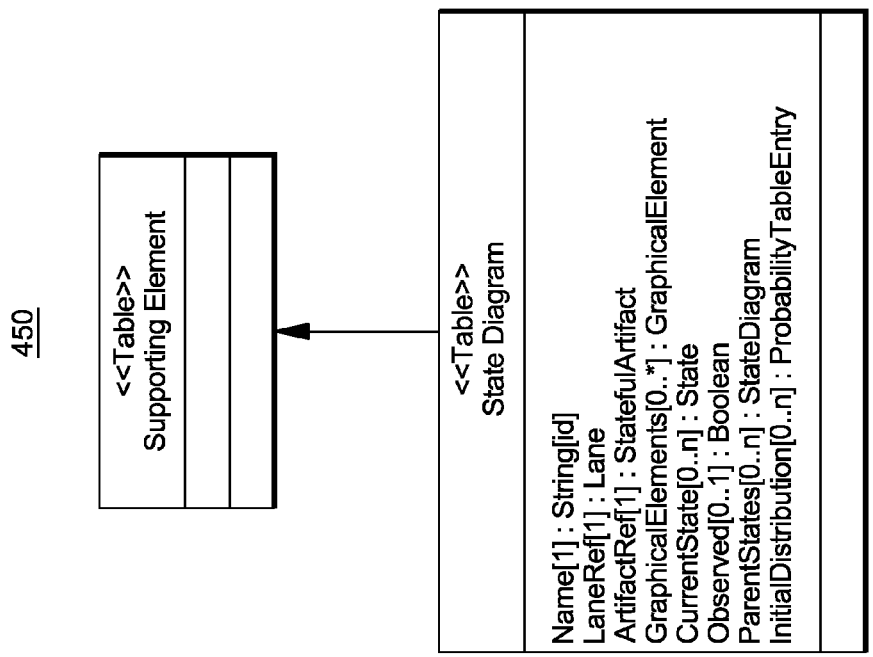
FIG. 12 depicts how the BPM State Diagram class is extended according to an example embodiment of the invention.

State Diagrams are extensions to BPMN (e.g., V 1.1) and are classed as "supporting elements." FIG. 12 depicts how this new element fits within the existing BPMN class diagram. In accordance with FIG. 12, the State Diagram subclass 450 has been extended to include the following attributes:

| Attributes | Description |
| --- | --- |
| Name: String | Name is an attribute that is a text description of a resource. |
| LaneRef: Lane | LaneRef provides a reference for the lane in which the state diagram is to be represented. |
| ArtifactRef: StatefulArtifact | ArtifactRef refers to the artifact to which the state diagram belongs. |
| GraphicalElements (0-n): GraphicalElement | The GraphicalElements attribute identifies all of the objects (e.g., States, State Transitions) that are contained within the State Diagram. |
| CurrentState (0-n): State | The CurrentState attribute references the current state of the state diagram. |
| Observed (0-1): Boolean | The Observed attribute is set to TRUE if the current state of the artifact has been observed, and FALSE if the current state is not known. |
| ParentStates (0-n): StateDiagram | The ParentStates attribute references any state diagrams (state variables) of stateful artifacts that may influence the initial probability distribution of the initial state assignment to be made in the preprocessing phase. The relationship graph of stateful artifacts and their parents MUST form a directed acyclic graph. |
| InitialDistribution (0-n): ProbabilityTableEntry | The InitialDistribution is a table that specifies, for each configuration of parent states, what the probability distribution from which to draw the initial state of the state diagram is to be during the preprocessing phase. For each configuration of parent states, the sum of the probabilities over states of the artifact MUST sum to one. |

Pool and Swimlane. In BPMN, processes are contained in pools, which are divided into a set of swimlanes that correspond to various process participants. Each activity of the process is assigned to a particular swimlane according to which participant is responsible for its execution. With regard to the business process, the definition of these objects are left intact; however, their use is extended to also contain state diagrams which describe the possible configurations of the various associated model objects that have a state, including jobs, resources, environmental factors, and performance measures. Each artifact may be assigned to a pool containing its associated state diagram. Each state variable is assigned to a swimlane within the pool, so that the nodes representing the range of states that may be taken by the artifact all reside within the swimlane. Flow object arrows indicating possible state changes start and end with states in the same swimlane.

State change events, described in greater detail below, may be attached to the pools and swimlanes, to indicate that one or more state variables may change in the event. These events may also be attached to the state nodes themselves, if the event only affects a single state variable of the object when that variable is in a particular state. In these cases, a state change arrow may originate at the state change event graphic.

Stateful Artifacts. Artifacts in BPMN represent entities that provide additional information about the process that is not directly related to the sequence or message flow. The following items describe new artifact classes that can be represented in the model either using a single graphical element (artifact notation), or through the pool and state diagram notation described herein above. Several means of representing these artifacts is provided to allow several layers of detail to be added to the model when necessary to highlight the risk-relevant relationships among these artifacts.

Figure 7:
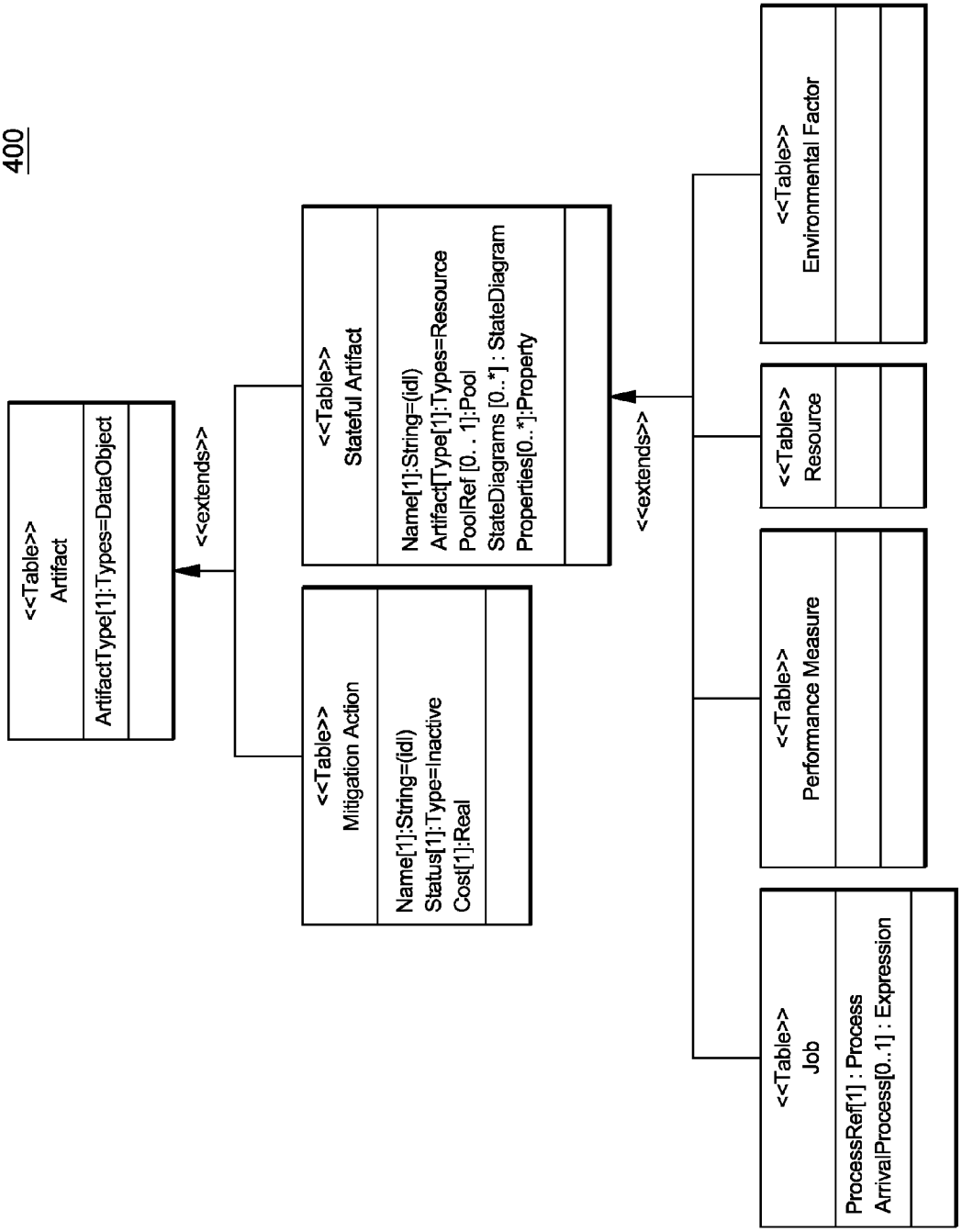
FIG. 7 depicts how the BPM class of artifacts is extended within the existing BPM class diagram according to an example embodiment of the invention.

According to the invention, the BPM class of artifacts is extended by defining two new subclasses, "mitigation actions" and "stateful artifacts". The latter subclass has four further subclasses: "Resource", "Environmental Factor", "Job," and "Performance Measure." FIG. 7 depicts how these new elements fit within the existing BPM class of artifacts 400 in an example embodiment.

In one embodiment, the entry for "ArtifactType" is removed and replaced with the following attribute:

| Attributes | Description |
| --- | --- |
| ArtifactType (DataObject \|Group\|Annotation\|Stateful \|Mitigation) DataObject: String | The ArtifactType MAY be set to DataObject, Group, Annotation, Stateful, or Mitigation. The ArtifactType list MAY be extended to include new types. |

In one embodiment, the "Stateful Artifact" subclass include the following attributes:

| Attributes | Description |
| --- | --- |
| Name: String | Name is an attribute that is a text description of a resource. |
| ArtifactType (Resource \|Job\|Environmental Factor \|Performance Measure) Resource: String | The ArtifactType MAY be set to Resource, Job, Environmental Factor, or Performance Measure. The ArtifactType list MAY be extended to include new types. |
| PoolRef (0-1): Pool | The attribute PoolRef MAY refer to a pool containing the state diagram for the states of the resource. |
| StateDiagrams (0-n): StateDiagram | The StateDiagrams attribute lists the state diagrams associated with the artifact. |
| Properties (0-n): Property | Properties of an artifact indicate details of the artifact type, which allow it to be associated with other artifacts and with risk events. |

In one aspect of the invention, the BPMN classes have been extended with a group of modeling classes and relations that are useful for risk modeling, along with constraints on the relationships among these entities. A graphical notation for displaying this information on a computing device is provided in view of FIG. 4 which depicts a key 100 to graphical vocabulary (i.e., a graphical notation (e.g., icons)) for extended metamodel entities and relations in one example embodiment of the invention. All other notation is standard to BPMN.

Job. Jobs 102 are represented as having both a set of attributes as well as a set of states. The value of the attributes define the type of job it is, which in turn defines the set of activities and resources required to process the job, as well as the relevant performance measures and influencing environmental factors. Job attributes do not change in the run time of the process. On the other hand, job states may change during run time, as they describe the state of completion or the quality of the job at any given point of the process.

Job types may be associated with an arrival process which describes the frequency of arrivals of tokens of that job type. This process may be described using further attribute values. In addition, the job type also determines the set of possible states that instances of that job type may fall into.

The "stateful artifacts" includes a "Job" subclass having the following attributes:

| Attributes | Description |
| --- | --- |
| ProcessRef: Process | The ProcessRef attribute refers to the process which is required to service the job. |
| ArrivalProcess (0-1): Expression | The ArrivalProcess attribute MAY be used to indicate a stochastic process or other mechanism that determines when job arrivals occur. |

Resources. Resources 104 are physical or virtual entities that are necessary for a process or activity to function. The unavailability of resources, or damage to resources, can have adverse consequences on activity execution and job quality. Compromised resources are modeled as being in one of several possible failure modes, or states. During process execution, the state of a resource may change due to the occurrence of a risk event, a state change event or the execution of an activity. In the compact representation form shown in FIG. 4, resources 104 are represented using a solid cylinder (but it is understood other graphical depictions are possible). In the swimlane representation, communication between the resource and the process activities is handled using flow objects, including message flow, state change relations, and inspection relations. Messages may be used to communicate the current state of the resource to process activities, and events occurring in the process flow may cause messages to be sent to the resource which trigger state changes. Not all resources persist over the course of several process executions. Some resources may be consumed in the execution of a process, such as an ingredient or part to an assembly process. No distinction is made between consumable resources and persistent resources in the graphical notation, although the interpretation of states and attributes for these resources may differ slightly. States of consumable resources may be used to distinguish the quality of one such resource from another; because the lifecycle of such resources is confined to one process instance, there is no need to model state changes in such resources. Also, the attributes of such resources may include information regarding their source, such as their manufacturer; the source itself may be modeled as a persistent resource which can affect the state of the consumable resource. If no state of such a resource is recorded prior to the start of process execution, the initial state of the resource may be assigned randomly according to a specified probability distribution at the preprocessing phase. No new attribute is added for this subclass of Stateful Artifacts.

Environmental Factors. An environmental factor 108 represents the state of some entity or quantity that is typically not within the scope of the jobs and resources associated with a process. Environmental factors may be associated with completely exogenous processes, such as exchange rates or regulations, or they may be associated with managerial decisions affecting the process as a whole, such as decisions whether to stop admitting new customers to a facility. These factors have a state that can affect the activity execution and other performance measures; in some instances, state changes in environmental variables may also cause state changes in resources and jobs. They are modeled in a similar way as resources. These are represented in a compact form in FIG. 4, e.g. as ellipses (but it is understood other graphical depictions are possible), but in expanded form as a swim lane enclosing a state diagram. No new attribute is added for this subclass of Stateful Artifacts.

Performance measures. Measures of the execution performance of a process or subprocess are typically computed as a function of the execution performance of the component activities. Performance measures may also be associated with the states of jobs with certain attributes at the end of the process. Performance measures 106 are represented using pentagons in the graphical models (but it is understood other graphical depictions are possible). In cases where the performance measures take qualitative values, a swimlane representation may also be used to better indicate how and when the performance measures are affected at various points in the process execution. When performance measures are affected by activity execution, the activity and the performance measure nodes are connected by the "can affect" or "can cause" relations. Finally, in some cases environmental factors may affect the severity of a performance measure, for example, exchange rates affect the severity of excess costs for processes executed in foreign countries. No new attribute is added for this subclass of Stateful Artifacts.

Mitigation Actions. Mitigation actions represent another class of artifacts that may be used to indicate changes to be made to the structure and dynamics of the process. The objective of a mitigation is to improve the global functioning of the process. Because of the wide variety of possible actions that can be taken to improve the risk profile of the system, a specification of how mitigation actions affect the process as a whole or individual elements of the process is provided. In the extended BPMN notation, mitigation actions 110 are typically associated with modifications to sets of parameters that govern and describe the functioning of the process, or to modifications in the process structure itself.

The "stateful artifacts" includes a "Mitigation actions" subclass having the following attributes:

| Attributes | Description |
| --- | --- |
| Name: String | Name is an attribute that is a text description of a mitigation action. |
| Status (Active\|Inactive) | The status of a mitigation action MUST be set to either Active or Inactive. |
| Cost: Real | The attribute Cost refers to the implementation cost of a mitigation action. |

With regard to the attribute changes of particular artifacts and activities, each such action may be associated with the risk events, resources, environmental factors, jobs, activities and performance measures. For instance, in an assembly system, investing in a sprinkler system may be modeled as affecting the probability of having machine (i.e., resource) unavailability in case of fire hazard. Other mitigations (e.g., investing in a redundant electrical generator) can be seen as affecting the probabilities of a risk event (e.g., power failure). The effect of a mitigation is captured through modified values of some of the attributes of the associated entities. In addition, the mitigation action may be associated with a variant of the entire process, if the action affects the structure or flow of the process itself.

A mitigation can either be already in place (active) or simply considered (inactive). This information may be captured through a status attribute. The set of active mitigation dictates what version of each element is to be considered. Thus by taming inactive mitigations active or vice versa, one can perform scenario analysis and determine what combination of mitigations yield improvements in process performance. From that perspective, each mitigation is associated with an implementation cost.

| Attributes | Description |
| --- | --- |
| EventType (Start\|End\|Intermediate\|Risk) Start: String | The event type MUST be of type Start, End, Intermediate, or Risk. |

State change event. State change events 114 may be thrown by any other event, such as an activity execution, risk event, or other state change events. They are caught by the artifact whose state changes in the event, which may be represented by the artifact or the swimlane notation. In the latter notation, the state change event may be attached either to the pool representing all state variables (if more than one variable changes value in the event), to the swimlane corresponding to a particular state variable (if the event only affects that variable), or to a particular state (if the event only affects the artifact if it is in that state). The state change event is associated with a table of transition probabilities from a list of initial states to end states. If the state change event is observed, then it is implicitly linked to an inspection event of the new state of the entity. Each possible transition in the table corresponds to a state transition arrow in the swimlane representation. Thus, in accordance with the invention, in the BPMN V. 1.1, a new "State Change Event" subclass includes the following attributes:

| Attributes | Description |
| --- | --- |
| StateDiagramRef: StateDiagram | The StateDiagramRef attribute refers to the state diagram whose states are to undergo transition in the event. |
| StateSource (1-n): State | The StateSource attribute indicates which state(s) of the target artifact that will change under the state change event. At least one StateSource MUST be defined. |
| StateTarget (1-n): State | The StateTarget attribute indicates the states to which the target artifact may change as a result of the state change event. At least one StartTarget MUST be defined. |
| TransitionProbabilities (1-n): TransitionProbability | A TransitionProbability MUST be defined for each StateSource and StateTarget pair. The probabilities for all StateTargets for a given StateSource must sum to one. |
| StatesObserved (0-n) True: Boolean | The Observed attribute indicates which of the resulting states of the target artifact will be observed. |

Events. Risk events 112, state change events 114, and inspection events 116 are added to the BPMN model. Both state change events and inspection events are classed as Intermediate Events in the BPMN specification, as they occur either to the subprocesses or state-related activities within the pool corresponding to a resource or environmental factor. Risk events, however, are not necessarily viewed as occurring within the context of a process flow, as they may occur exogenously, and therefore these events are classed outside of the usual categories of Start, End, and Intermediate Events. The BPMN specification further distinguishes between throwing (or generating) an event and catching (or consuming) an event.

Figure 9:
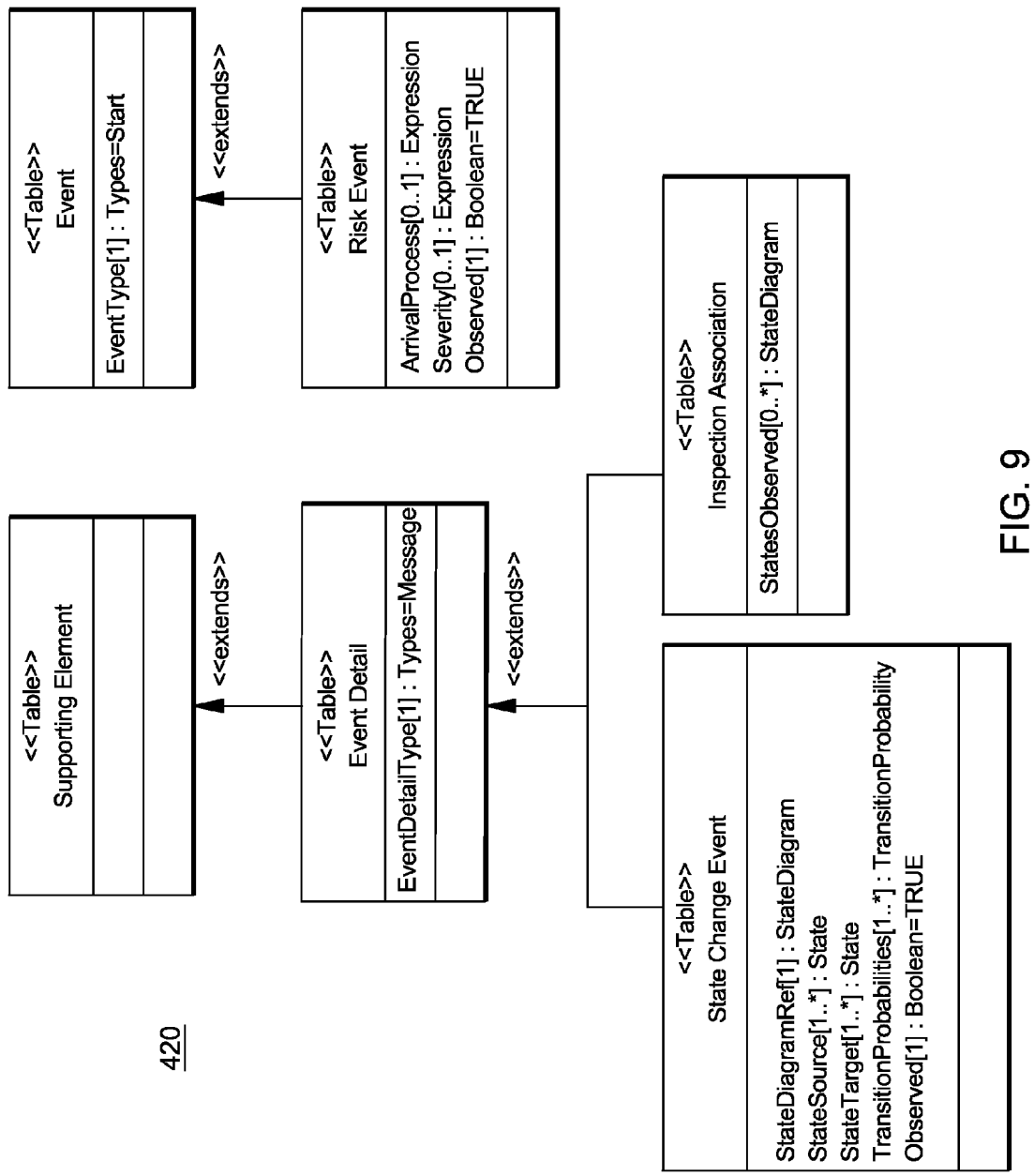
FIG. 9 depicts how the BPM class of events is extended within the existing BPMN class diagram according to an example embodiment of the invention.

According to the invention, the BPM class of events is extended by defining three new subclasses: "Risk Event", "State Change Event", and "Inspection Event". FIG. 9 depicts how these new elements fit within the existing BPMN (Version 1.1) class of events 420 in an example embodiment.

Thus, in accordance with the invention, the BPMN V. 1.1 "EventType" attribute is removed and replaced with the following Common Event Attribute Extension:

Risk event. A risk event 112 is a root cause of disruption of a process, which either triggers state change events in resources or jobs, or is associated with procedural or execution errors in processes or activities. Risk events may be assigned attributes which may be used to link them to those resources and jobs of a certain type whose states they can affect, or which specify their frequency or severity of occurrence. Risk events are not necessarily confined to any swim lane. A risk event is usually thrown by the environment. To express that it is thrown within a process, it may be included into the process flow as an intermediate event. For modeling that a process or activity catches a certain risk event, this risk event is attached at the process or activity boundary. Thus, in accordance with the invention, in the BPMN V. 1.1, a new "Risk Event" subclass includes the following attributes:

| Attributes | Description |
| --- | --- |
| ArrivalProcess (0-1): Expression | The arrival process attribute expression indicates the frequency of occurrence of the risk event. |
| Severity: Expression | The severity attribute expression provides an indication, here appropriate, of the severity of given risk occurrence. |
| Observed True: Boolean | The Observed attribute indicates whether the occurrence of risk event is known. |

Inspection. An inspection event 116 implies that the current state of a certain stateful artifact is observed. For simplicity, it is assumed that the state is observed perfectly, so there is no remaining uncertainty about the state after the inspection. The observation of a failure state may lead to remedial processes via exception flows. Inspections are assumed to be implicitly a part of decision nodes and activity executions, insofar as the decision rules and activity preconditions check these rules. Inspection events may trigger other inspections or job arrivals to processes, especially maintenance or remediation-related processes. Thus, in accordance with the invention, in the BPMN V. 1.1, a new "Inspection Event" subclass includes the following attributes:

| Attributes | Description |
|---|---|
| StatesObserved (0-n): | The StatesObserved attribute indicates the state diagram whose current state is observed in the inspection event. |

Figure 8:
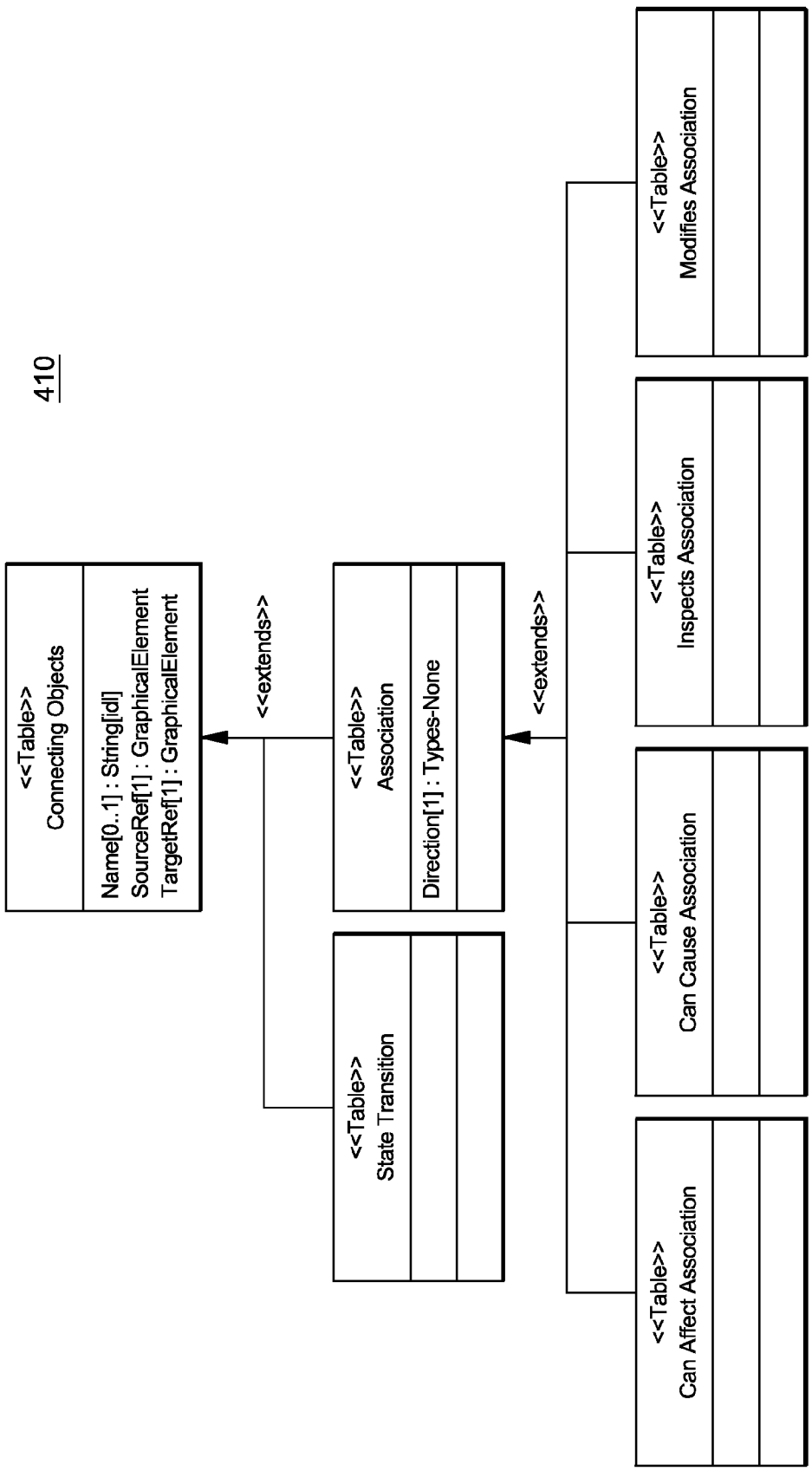
FIG. 8 depicts how the BPM class of graphical connecting objects is extended within the existing BPMN class diagram according to an example embodiment of the invention.

Associations. Four new directional associations 120 are provided between modeling elements in accordance with the invention as shown in FIG. 4; "Can Cause," "Inspects," "Can Affect," and "Modifies." Each of these is depicted by dotted line 121 as shown in FIG. 4. Thus, in accordance with the invention, the class of graphical connecting objects in the BPMN class diagram is extended by defining a new subclass "State Transition," as well as four new types of associations: "Can Affect, "Can Cause", "Inspects", and "Modifies." FIG. 8 depicts how these new elements fit within the existing BPMN class of graphical connecting objects 410 in an example embodiment.

The new subclass "State Transition" relation requires no new attributes. The SourceRef and TargetRef attribute may include only States.

The "Can Cause" association holds among various events, when one may cause or give rise to another event. All events may be the source or target of this association. Activities may also be the source of a can cause association, which indicates that the activity execution event triggers other events to occur. In connection with the modified BPMN class diagram, no new attributes are required for the Can Cause relation. It is noted that the Direction attribute MUST be set to One. The SourceRef and TargetRef attribute may include any Event; additionally, an Activity may be a SourceRef.

The "Inspects" association holds between inspection events and the stateful artifact whose state is inspected in the event. The target of the relation is either the graphical element for the artifact, or its associated swim lane. Activities and data-based gateways are allowed to be the source of this association if there is an implied inspection in the precondition checks associated with those elements. In connection with the modified BPMN class diagram, no new attributes are required for the Can Cause relation. It is noted that the Direction attribute MUST be set to One. The SourceRef may include only Activities, Gateways, and Inspection Events. The TargetRef may include only swimlanes containing state diagrams of stateful artifacts.

The "Can Affect" association holds among risk events, activities, and artifacts. It often holds between entities for which one or more "Can Cause" relations have been defined among events associated with those entities. When performance measures are the target, it means that the entity at the source is associated with states or events that can lead to a change in the performance measure. When activities are the target, it means that activity execution may be affected by states or events of the source object. When resources or environmental factors are the target, it means their states may be affected. Risk events may only be the source of this relation, and never the target. In connection with the modified BPMN class diagram, no new attributes are required for the Can Affect relation. The Direction attribute MUST be set to One. The SourceRef attribute may include only the following element types: Risk Event, Resource, Environmental Factor, Activity, and Job. The TargetRef may include only the following element types: Resource, Environmental Factor, Activity, Job, and Performance Measure.

The "Modifies" association holds between mitigation actions as the source, and any artifact, activity, or risk event as the target. Similar to "can affect," this relation indicates that the mitigation action would have an impact on the target element if it has status active, but rather than indicate a modification of the state of an artifact or the outcome of an activity execution, "modifies" indicates a change in the attributes of the element. For example, it may indicate a change in the frequency or severity of risk events, or the state change transition probabilities of a resource or job, or the probability of execution errors in an activity. In connection with the modified BPMN class diagram, no new attributes are required for the Modifies relation. It is noted that the Direction attribute MUST be set to One. The SourceRef may include only Mitigation Actions. The TargetRef may include only the following element types: Risk Event, Resource, Environmental Factor, Activity, Job, and Performance Measure.

Extensions to Supporting Elements

Figure 10:
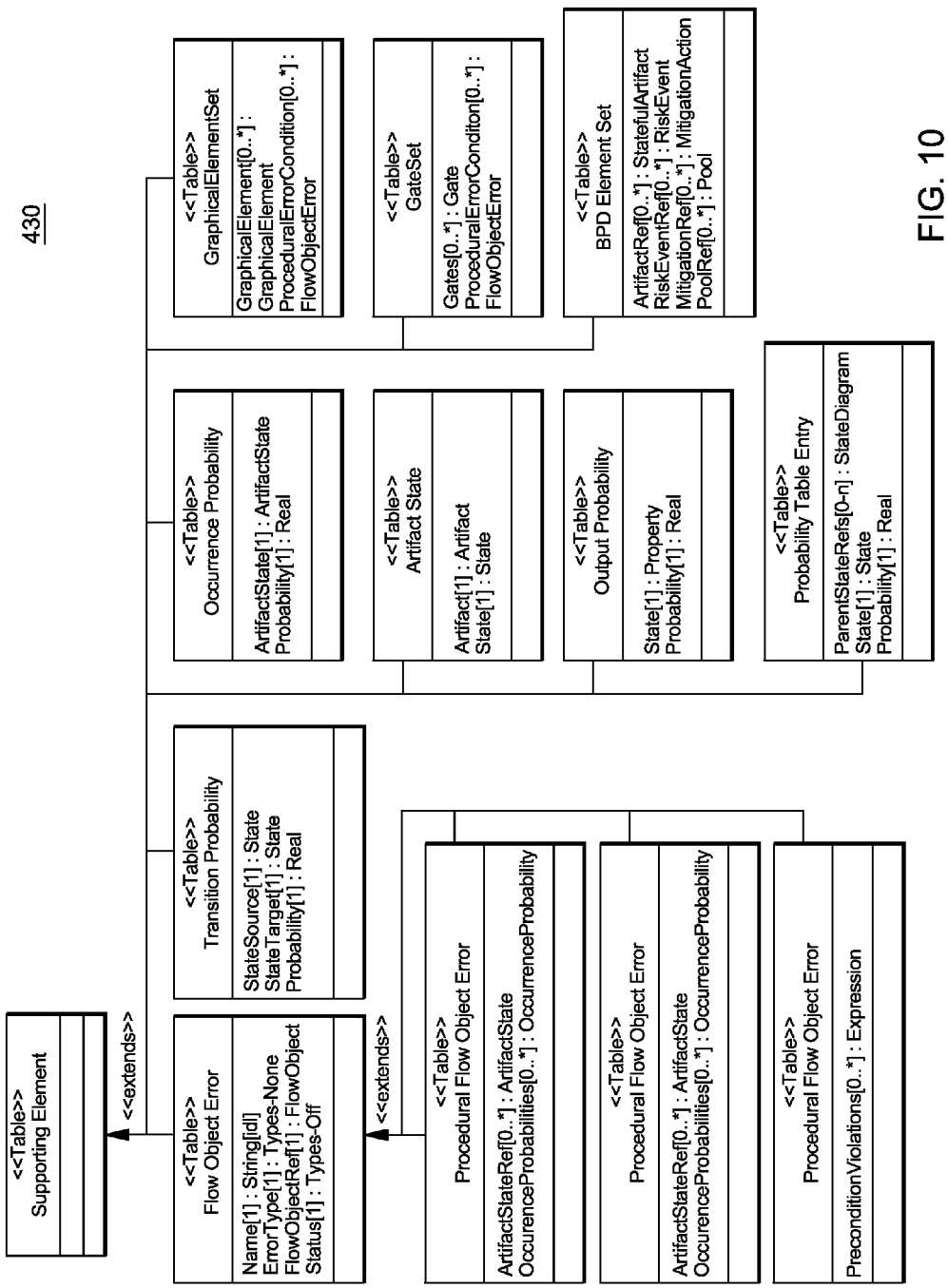
FIG. 10 depicts how the BPM class of supporting elements is extended within the existing BPM class diagram according to an example embodiment of the invention.

According to the invention, as shown in FIG. 10, the class of supporting elements 430 is extended by defining nine new subclasses: Flow Object Error, Transition Probability, Artifact State, Output Probability, Probability Table Entry, Occurrence Probability, GraphicalElementSet, GateSet, and BPD Element Set. FIG. 10 depicts how these new elements fit within the existing BPMN class diagram. In one aspect of the invention, in the BPMN model, the Artifact Input Attribute Extensions class is extended to include the following RequiredStates and ErrorCondition attributes as follows:

| Attributes | Description |
|---|---|
| RequiredStates (0-n): String | The RequiredStates attribute specifies the set of acceptable states of the artifact to be in in order for activity execution to begin. Absence of any RequiredStates indicates that all states are acceptable. |

| Attributes | Description |
|---|---|
| ErrorCondition (0-n): FlowObjectError | The ErrorCondition attribute MAY reference one or more FlowObjectErrors which condition the input set on the occurrence of a procedural error. The FlowObjectError MUST be of the type "Procedural." |

In the BPMN model, the Artifact Output Attribute Extensions class is extended to include the following attributes:

| Attributes | Description |
|---|---|
| OutputStates (0-n): String | The OutputState attribute indicates the state of the artifact upon completion of the activity. |
| OutputProbabilities (0-n): OutputProbability | Output probabilities SHALL be specified for each of the OutputStates attributes. These probablities must sum to one. |

In the BPMN model, the Error Event Details subclass is extended to include the following attribute:

| Attributes | Description |
| --- | --- |
| FlowObjectErrorRef (0-n): FlowObjectError | The FlowObjectErrorRef attribute MAY reference one or more Flow Object Errors that give rise to the error event. |

In view of FIG. 10, a FlowObjectError subclass is provided in the BPMN model to include the following attributes:

| Attributes | Description |
| --- | --- |
| Name 1: String | Name is an attribute that is a text description of the object. |
| ErrorType (Procedural\|Execution\|Precondition): String | The error type is an attribute that provides information about whether it represents a procedural error, an execution error, or a precondition error. |
| FlowObjectRef 1: FlowObject | The Flow Object Reference attribute indicates the Flow Object that is affected by this error. These MUST be of the type Activity or Gateway. |
| Status (On\|Off) Off: String | The error status is an indicator, set during the preprocessing phase of the activity, of whether the error occurs or not (corresponding to "On" and "Off," respectively). The default value is Off. |

The following are additional attributes of a Procedural or an Execution Flow Object Error class (i.e., where the ErrorType is set to "Procedural" or "Execution"). That is, a Procedural or Execution FlowObjectError subclass is provided in the BPMN model to include the following attributes:

| Attributes | Description |
| --- | --- |
| ArtifactStateRef (0-n): ArtifactState | The ArtifactStateRef attribute represents a pairing of an artifact and the value of a state of the artifact. |
| OccurrenceProbabilities (0-n): OccurrenceProbability | The OccurrenceProbability attribute determines the likelihood that a given procedural or Execution Flow Object Error occurs during the execution of an activity, given the state values of the artifacts referenced in ArtifactStateRef. |

The following are additional attributes of a Precondition Flow Object Error (i.e., where the ErrorType is set to "Precondition"). That is, a Precondition Flow Object Error subclass is provided in the BPMN model that includes the following attributes:

| Attributes | Description |
| --- | --- |
| PreconditionViolations (0-n): Expression | The PreconditionViolations attribute MAY contain one or more expressions that describe the nature of a precondition violation, namely which states of which artifacts are not in compliance with the requirements. |

In one embodiment shown in FIG. 10, a Transition Probability subclass is provided in the BPMN model to include the following attributes:

| Attributes | Description |
| --- | --- |
| StateSource: State | This attribute specifies the current state of the artifact (which is to be changed in a state change event.) |
| StateTarget: State | This attribute specifies the transitional state of the artifact (to which the state will change in a state change event.) |
| Probability: Real | Probabilities represent the likelihood of changing to the state target given the state source, set, given an input set and a set of flow object errors. They are real numbers between 0 and 1. |

In one embodiment shown in FIG. 10, an Occurrence Probability subclass is provided in the BPMN model that includes the following attributes:

| Attributes | Description |
| --- | --- |
| ArtifactState: ArtifactState | The ArtifactState attribute MUST reference an Artifact-State Pair. |
| Probability: Real | The Probability attribute determines the likelihood that a given procedural or Execution Flow Object Error occurs during the execution of an activity. It is a real number between 0 and 1. |

In one embodiment shown in FIG. 10, the ArtifactState Attribute subclass is provided in the BPMN model that includes the following Artifact-State Pairs attribute:

| Attributes | Description |
| --- | --- |
| Artifact: Artifact | The Artifact attribute MUST reference an Artifact. |
| State: State | The State attribute MUST reference a state that is an element of the state diagram of the artifact. |

In one embodiment shown in FIG. 10, an Output Probability subclass is provided in the BPM model that includes include the following attributes:

| Attributes | Description |
| --- | --- |
| State: Property | The output set references the state of an attribute that is output at the end of an activity. There MUST be a State specified for each state of the artifact. |
| Probability: Real | Probabilities represent the likelihood of returning the artifact output in a given state. They are real numbers between 0 and 1. |

In one embodiment shown in FIG. 10, an Probability Table Entry subclass is provided in the BPMN model that includes include the following attributes:

| Attributes | Description |
| --- | --- |
| ParentStateRefs (0-n): StateDiagram | The ParentStateRefs attribute refers to all the state diagrams of the "parent" artifacts, whose current state values influence the probability that the child artifact is initialized in a given state. |
| State: State | The State attribute refers to a state or state value of the artifact which may be an initial state of the artifact. |
| Probability: Real | Probabilities represent the likelihood of the artifact being initialized in a given state. They are real numbers between 0 and 1. |

In one embodiment shown in FIG. 10, a Graphical Element Set subclass is provided in the BPMN model that includes include the following attributes:

| Attributes | Description |
| --- | --- |
| GraphicalElements (0-n): GraphicalElements | The GraphicalElements attribute identifies all of the objects (Events, Activities, Gateways, Artifacts, etc.) that are contained within a Process. |
| ProceduralErrorCondition (0-n): FlowObjectError | The ProceduralErrorCondition lists all of the procedural errors that are associated with the process variant represented by the set of graphical elements. These MUST be uniquely specified across all GraphicalElementSets. The referenced FlowObjectErrors MUST be of the type "Procedural." |

In one embodiment shown in FIG. 10, a Gate Set subclass is provided in the BPMN model that includes include the following attributes:

| Attributes | Description |
| --- | --- |
| Gates (0-n): Gate | The Gates attribute identifies all the gates that are contained within a Gateway object. |
| ProceduralErrorCondition (0-n): FlowObjectError | The ProceduralErrorCondition lists all of that are associated with the gateway variant represented the procedural errors by the set of gates. These MUST be uniquely specified across all GateSets. The referenced FlowObjectErrors MUST be of the type "Procedural." |

In one embodiment, a BPD (Business Process Diagram) Element Set subclass is provided in the BPMN model that includes include the following attributes:

| Attributes | Description |
| --- | --- |
| ArtifactRef (0-n): StatefulArtifact | The ArtifactRef attribute lists all the resources, performance measures, and environmental factors to be represented in the business process diagram. The listed artifacts MUST be of the type Resource, Performance Measure, or Environmental Factor. |
| RiskEventRef (0-n): RiskEvent | The RiskEventRef attribute lists all the risk events to be represented in the business process diagram. |
| MitigationRef (0-n): MitigationAction | The MitigationRef attribute lists all the mitigation actions to be represented in the business process diagram. |
| PoolRef (1-n): Pool | A business process diagram SHALL contain one or more pools. |

Further, in accordance with a modified BPMN (e.g. V. 1.1) specification, in one embodiment of the invention, the "Graphic Elements" attribute of the Process Attributes class is removed replaced with the following attributes:

| Attributes | Description |
| --- | --- |
| GraphicalElementSets (1-n): GraphicalElementSet | A graphical element set identifies a group of graphical elements that define a process or process variant. Each set is correlated with one or more procedural errors. |
| AssignmentRules (1-n): Expression | The assignment rules attribute is an expression that specifies for each procedural error a corresponding GraphicalElement Set. |

Example process model diagrams are provided in an exemplary embodiment that illustrate a schematic process example incorporating the concepts and notations described herein. The first provides high-level risk information using what is referred to as a "level-one diagram." The second, "level-two" diagram includes much more detail regarding the states of the resources, jobs, and environmental factors, as well as the relationships between various events.

The data models for risk-extended business process models can be complex, and the invention provides means of displaying the information in the data models that best facilitates key insight into operational risk, especially as regards the criticality and vulnerability of various process elements. In addition, these are linked to quantitative models for computing the likelihood of adverse events and their effects on performance metrics. Three methods for displaying the risk models are provided: level-one and level-two risk-extended process diagrams, as well as element-centric event chain diagrams. The first two diagrams may be translated to Bayesian network models and discrete-event simulation models, respectively, for quantifying the distributions of the performance measures of the process. The event chain diagrams provide structural insight into the criticality and vulnerability of resources, activities, and risk events.

Figure 5A:
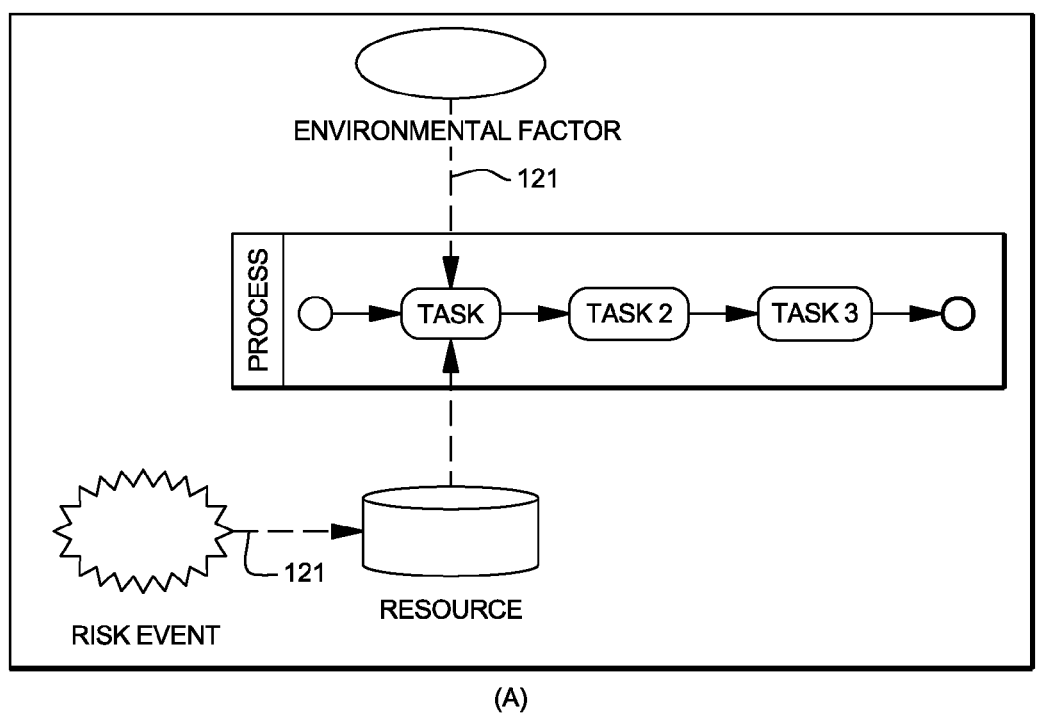
FIGS. 5A and 5B depict respective high-level and detailed views of example risk-related interactions among business model elements modeled in accordance with the present invention.
Figure 5B:
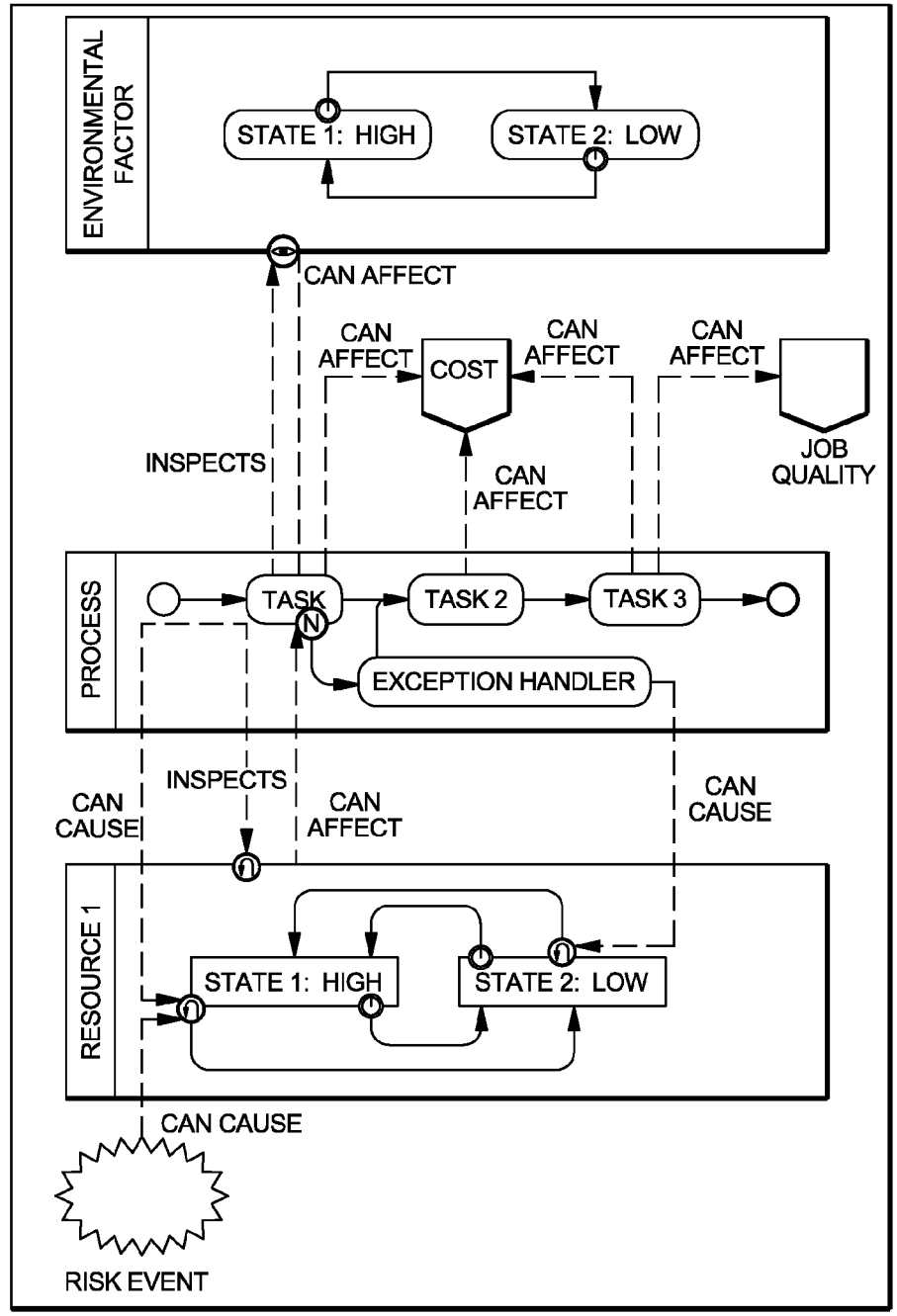

Particularly, FIGS. 5A and 5B depict high-level and detailed views of example risk-related interactions among model elements modeled in accordance with the present invention. FIG. 5A indicates that a resource of a certain type supports Task 1 in the process, and this resource is susceptible to the risk event. In addition, an environmental factor can affect the functioning of an activity. The process is measured in terms of cost and job output quality. FIG. 5B provides more detail on the states and state changes of the resources and environmental factors, and how these are triggered through the risk event to the resource, the activity supported by the resource, and exception handlers for activity execution errors. There is additionally specified where the contributions to the performance measures come from among the various jobs and activities.

More particularly, the example Level-One Risk-Extended Process Diagram 150 shown in FIG. 5A displays the process associated with a given job type, along with icons representing artifacts such as resources, performance measures, environmental factors, as well as risk events. The "Can Affect" relation 121 is primarily used to link these elements, although the "Inspects" relation may also be used. A level-one diagram can be mapped to a Bayesian network model for risk evaluation of the performance of a single, randomly selected process instance. For each activity in the network, nodes are included for the following: 1) The state of each supporting resource, job, and environmental factor as of the time of the job's arrival to the activity. ("Input nodes"); 2) Indicators of the occurrence of various errors in activity execution. ("Error nodes"); 3) The state of each supporting resource, job, and associated performance measure as of the time of the job's departure from the activity. These may coincide with the nodes for the prior conditions of resource and environmental factors of the following activity in the process ("Output nodes").

Each input and error node is connected to each output node for each activity. Gateways can be handled in a similar manner. In addition, nodes are included for resources which support other resources in the model, as well as nodes for risk events that specify whether the risk event occurs or not. These nodes are linked with each other and the existing nodes in the network according to the Can Affect associations among them. Using the probabilities specified in the metamodel, the functions mapping inputs to outputs for each activity, and the state relations specified by the Can Affect association, one can populate a Bayesian network that links the initial states of the resources, jobs, and environmental factors to the various performance measures.

An example Level-Two Risk-Extended Process Diagram 200 shown in FIG. 5B displays all the information associated with the process for a given job type graphically, including the relations among events and states of each artifact. The "Can Cause" and "Inspects" associations are used in these diagrams to document more precisely the nature of the relations among the model entities than does the "Can Affect" association.

Because the extended classes and execution semantics of the risk-extended metamodel have been expressed so that it is consistent with an executable process modeling language, e.g., BPMN, the existing capabilities of discrete-event simulation packages that use the current BPMN standard can be built upon.

In one aspect of the invention, Element-Centric Event Chain Diagrams rearrange the Level One diagrams so that it focuses only on a single activity, resource, risk event, environmental factor, or performance measure. Such diagrams show all the factors and elements in the model which affect, and are affected by, this element of the model. These diagrams are useful because they provide direct structural insight into the criticality and vulnerability of each element in turn. Common vulnerabilities may come to light when, for example, common properties of resources are linked to a single risk event.

These models can be extended beyond the level-one diagram concepts to include more detailed information on causal chains of events. For example, one can map all the state changes and performance impacts due to a single risk event by following the various "Can Cause" relations in the level-two diagram.

Figure 6:
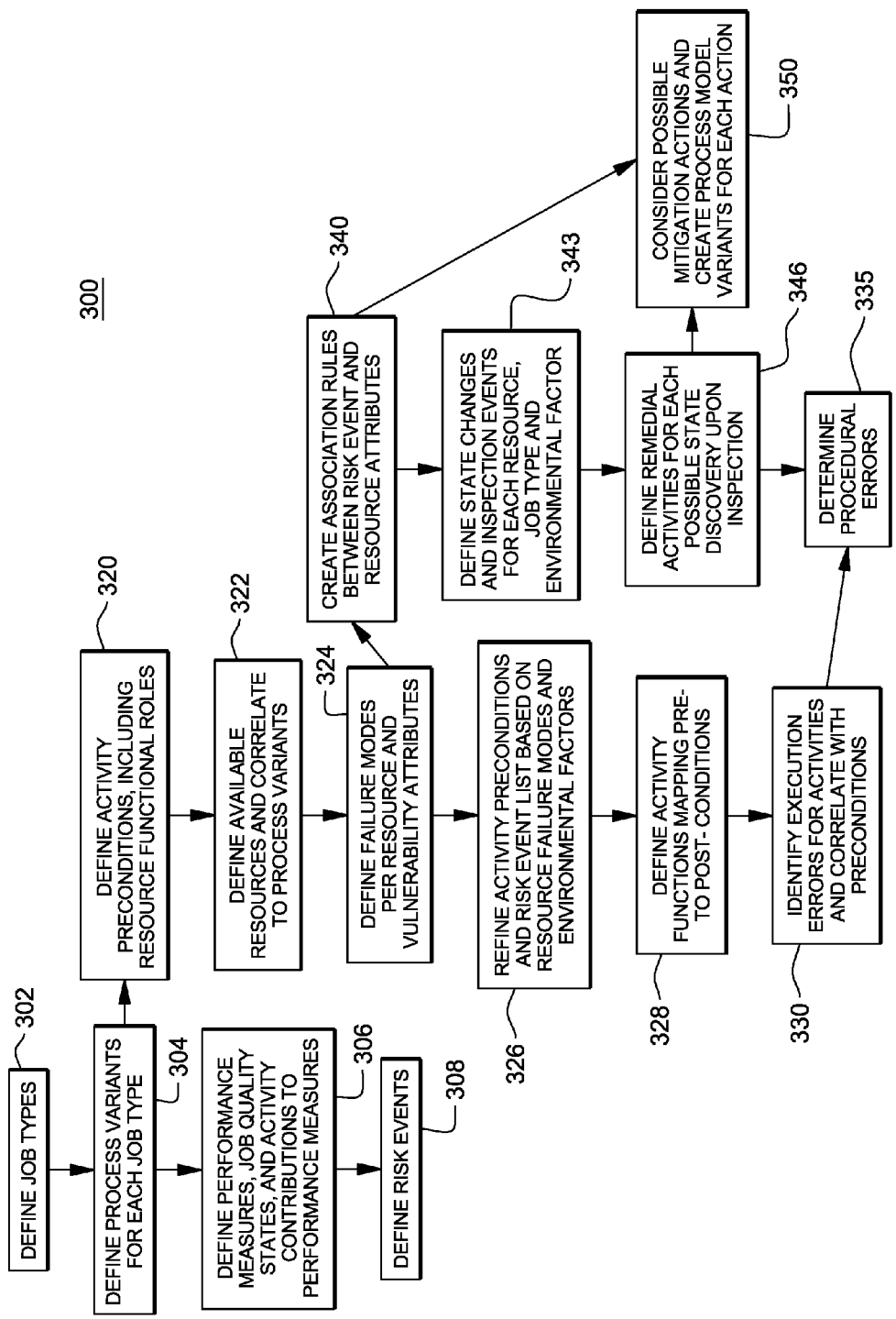
FIG. 6 depicts an example stepwise process 300 for identifying, collecting and integrating risk-extended business process model data in accordance with an embodiment of the present invention.

An example stepwise process 300 for populating the risk model is now described in reference to FIG. 6 as follows:

As shown in FIG. 6, a first step 302 involves defining the job types that are to be processed in this model and, to characterize jobs by attributes that will be relevant in determining the order of activities to be performed (including actions to be taken at decision branch nodes), the resources required, and the measures of output quality. Then, at 304, for each identified job type, there are defined process variants for each job type. This step further includes defining a business process model for processing jobs of that type, e.g., using the standard BPMN modeling notation as described herein. Continuing from step 304, there is further performed at 306 defining performance measures, job quality states, and activity contributions to performance measures. That is, at step 306, there is performed defining a set of performance measures related to activity execution and to job output quality, for each job type. Job states are defined according to the different levels of quality that may be encountered. As part of this step, there is also included determining how aggregate execution performance measures for the business process as a whole are to be determined by execution measures for individual activities. Then, at step 308, there is performed defining an initial set of risk events of interest, and assigning various attributes to the events, which describe their frequency and severity levels, and linking them to various resource classes.

As further shown in FIG. 6, the step 304 of defining process variants for each identified job type, may involve additional steps 320-330. For example, from step 304 there is performed a step 320 of defining activity preconditions, including resource functional roles. That is, for each activity in the process model, identifying the functional roles played by resources that are required to support the activity, and, creating a list of preconditions that must be fulfilled by the resources filling these functional roles for the activity to execute. From, step 320, there is further performed at 322 defining available resources and correlating them to process variants. That is, there is performed defining the set of resources that will fulfill the functional roles for all process instances and job types, and assigning each resource to the appropriate activities and a set of job types which that resource can support in that role. From, step 322, there is further performed at 324 defining failure modes per resource and vulnerability attributes. That is, at step 324, for each resource, there is performed determining the likely ways in which the resource may be compromised or unavailable, such that it would affect the execution of the activities that it supports. Additionally, attributes are created for resources that correspond to indicators of vulnerabilities to risk events, as well as attributes that will help to match the resource with supported job types.

An example might be the version of an operating system running on a computer. If all the computers in a data center are running an outdated version of Windows, then they may all be vulnerable to the same computer virus. This would be implemented by defining an attribute for each computer that would store as a value the version of the operating system it is running. Another example would be having two backup data centers that are both located on the San Andreas fault. The vulnerability to earthquakes might be recognized through setting a "location" attribute for each of the data centers that lists its address or GPS coordinates.

Continuing from step 324, there is further performed at 326 refining activity preconditions and risk event list based on resource failure modes and environmental factors. That is, at step 326, there is performed defining the preconditions for the activities in terms of the failure modes of each resource. If there are external factors that must be satisfied in order to begin activity execution, then this step includes defining environmental factors and state values accordingly. Continuing at step 328, there is performed defining activity functions mapping pre- to post-conditions. That is, at 328, there is performed defining a function for each activity that maps states of resources, jobs, and environmental factors, as well as the occurrence or non-occurrence of various execution errors, to output states of resources and jobs, as well as to activity execution performance measures.

The following represents an example mapping function in an example context of toy doll manufacturing: One activity in the manufacturing process is painting the dolls. The states of the jobs (dolls) may be defined as "product safety and quality compliant" and "noncompliant." The resources needed for the task are paint and a person. The paint resource may take the state "contains lead" or "is safe". The activity function mapping input to output states could be defined as follows:
f(Input states of job, resource)=(Output state of job)
f(compliant, is safe)=(compliant) with probability 0.99
f(compliant, is safe)=(noncompliant) with probability 0.01
f(compliant, contains lead)=(noncompliant) with probability 1
f(noncompliant, . )=(noncompliant) with probability 1

The example context of toy doll manufacturing could be expanded upon to additionally include environmental factors. For example, to include execution errors, the possibility that the worker improperly applies the paint so that the quality standards are not met might be included. Now all probabilities of output states are one (i.e., explicitly modeling the execution error makes the output of the activity fully determined by the inputs). With the example activity function mapping input to output states defined as follows:
f(compliant, is safe, no execution error)=(compliant)
f(compliant, is safe, execution error)=(noncompliant)
f(compliant, contains lead, . )=(noncompliant)
f(noncompliant, . , . )=(noncompliant)

It is noted that in this toy doll manufacturing example, the input sets are just the various sets of states in which the activity may function (compliant/noncompliant, contains lead/is safe). If a state of a resource of "available/unavailable" are additionally included (e.g., the person assigned to painting the toy), then the set (compliant, is safe, available) is an input set, but (compliant, is safe, unavailable) is not an input set, because the activity cannot be performed without the employee there and the IORules for mapping input sets and execution errors to output sets are described in this example.

Continuing to step 330, there is performed identifying execution errors for activities and correlating them with preconditions. For this step there is considered the execution of each activity and a determination of what can go wrong. If an execution error may persist over several process instances, then the method includes locating a source of the error in one of the supporting resources or environmental variables. If the execution error could only affect a single process instance, then there is defined a corresponding error associated with the activity.

As further shown in FIG. 6, the step 330 of identifying execution errors for activities and correlating them with preconditions may involve an additional step 335 of determining procedural errors. At step 335, there is performed determining any procedural errors that may also take place in terms of skipping activities, not fulfilling preconditions appropriately, etc., and defining any additional decision branches needed to capture the various alternative routes that could be taken under each error scenario.

As further shown in FIG. 6, the step 324 of defining failure modes per resource and vulnerability attributes may involve additional steps 340-346. For example, from step 324 there is performed a step 340 of creating association rules between risk event and resource attributes. This step involves considering particular risk events of interest that will affect resources, and correlating them to resource classes according to their vulnerability indicator attributes. This includes determining what failure modes in the resources that the risk events are likely to lead to. As an example, for a risk scenario of an earthquake occurring on the San Andreas fault (risk event) that destroys all the data centers owned by a company in the San Francisco Bay Area (location attribute) the rule would map the geographical disaster occurrences to the resources located in that area. The rules allow one to automatically generate dependencies between a risk event and all the resources which it affects.

Additionally, for every failure mode, there is considered sets of events that may lead to the resource being in that state. Thus, risk events and state change events are defined accordingly. From step 340 there is performed a step 343 of defining state changes and inspection events for each resource, job type, and environmental factor. That is, for each failure mode of each resource, and for each state change leading to that failure mode, there is performed steps for answering the following questions: 1) When the state changes, would it be detected under the circumstances? If not immediately, then when, if ever? Thus, there is additionally performed the steps of determining points in the process where inspections of the resource state implicitly or explicitly occur, such as activity precondition checks and decision nodes. This step includes performing the same exercise with the state changes associated with jobs and environmental factors. From step 343 there is performed a step 346 of defining remedial activities for each possible state discovery upon inspection. This step involves considering what actions would be taken when it is discovered that a resource or job is in a "failure mode," or how one might react to the environmental variables changing.

Thus, there is performed defining any subprocess or auxiliary processes that would be triggered in order to bring the state back to normal, along with associated activity execution and job arrival events. This can lead to further process variants that are created.

Finally, as further shown in FIG. 6, the step 340 of creating association rules between risk event and resource attributes involves an additional step 350 of considering possible mitigation actions and creating process model variants for each action. That is, at step 350, there is performed preparing a list of considered mitigation actions, if appropriate. For each mitigation action, there is performed determining the attributes of the various risk events, resources, jobs, activities, etc. that are affected by the action, or determining if a process variant is required to capture larger structural changes to the process that would occur if the action is taken. This includes creating variants of all affected artifacts, activities, and processes, and specify how these variants are to be associated within the business process under the mitigation action.

Although the methodology presented herein and described with reference to FIG. 6 is presented as a staged process that builds from a standard business process model to realize a risk-extended business process model, it is understood that this may be an iterative process with several iterations likely needed in practice to complete the model, as one cannot always anticipate all the information required for a certain model element.

Figure 13:
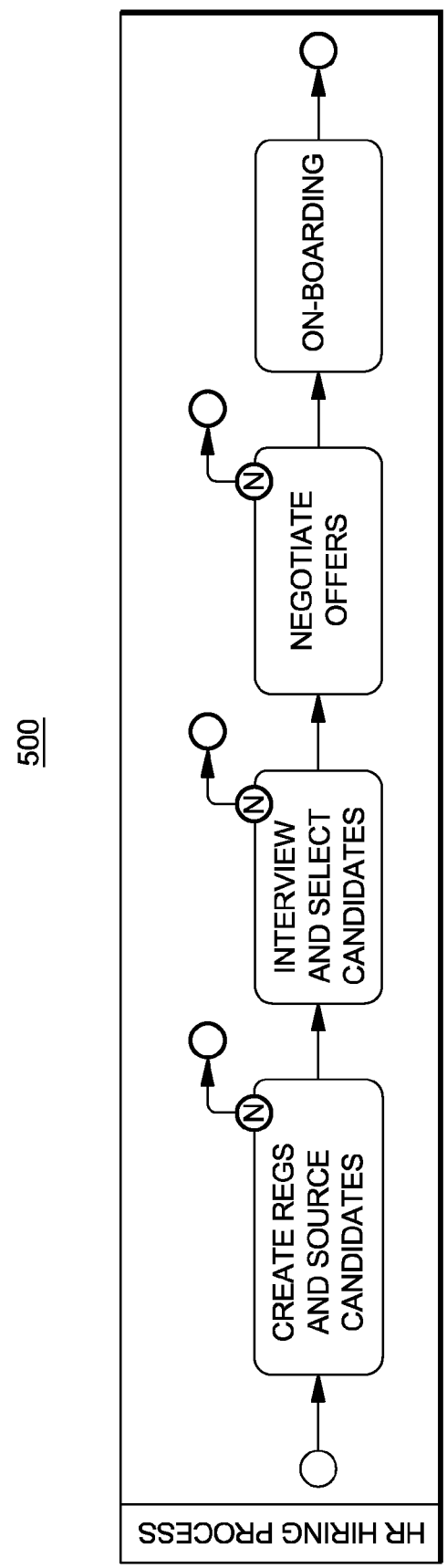
FIG. 13. depicts an example graphical representation of an employee hiring process 500 in an example application of the invention.

An example application of the present invention is now illustrated in accordance with FIG. 13. As shown in FIG. 13, the notation developed herein above is used to describe an example human resources process for hiring applicants to jobs in a developing nation. The basic process 500 is pictured in FIG. 13 which is displayed as a linear process illustrating the four basic steps of documenting job requirements and sourcing candidates, interviewing and selecting candidates, negotiating offers, and on-boarding new hires. At each of the first three stages of the process, applicants can be removed from consideration, either because they do not meet the requirements, or they prove to be unsuitable candidates during the interview, or they do not accept the offer. Here, applicants are the "jobs" in this process, and they have three unobserved binary state values when they arrive to the process: whether or not they meet the job requirements, whether or not they are desirable candidates, and whether or not they will accept the offer that is to be made. The error events that are pictured in the diagram correspond to the events where \the applicant does not meet the initial criteria," "the applicant is not a suitable hire," and "the applicant is not prepared to accept the offer." Each of these errors result in the triggering of an end event, at which point the process terminates without a successful hire being made.

Figure 14:
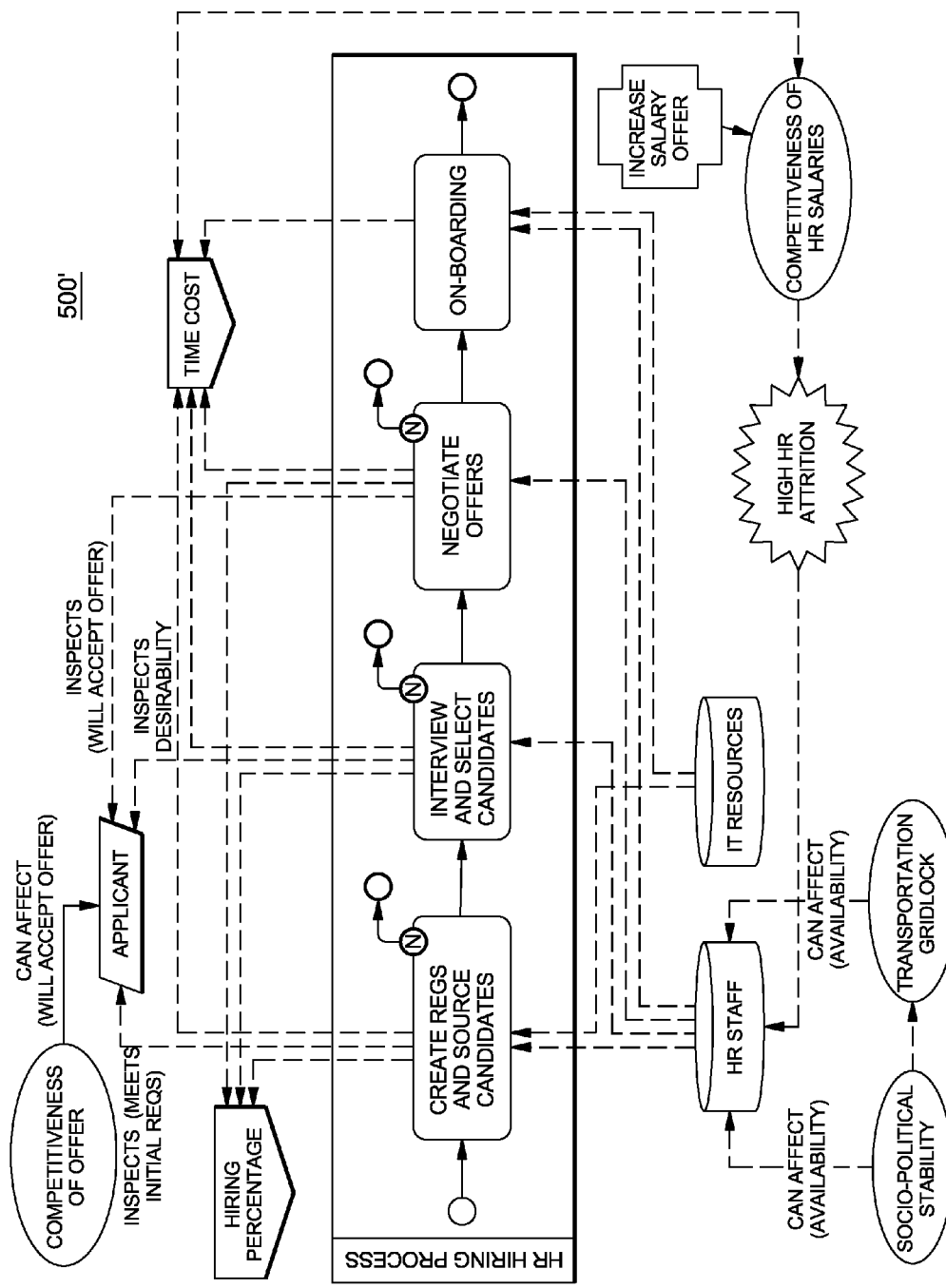
FIG. 14 illustrates additional information displayed in the example graphical representation of the process diagram of FIG. 13 that better indicates the sources and effects of risk in an example application of the invention.

FIG. 14 illustrates additional information displayed in the level-one diagram of FIG. 13, the additional information to this process model better indicating the sources and effects of risk. First, the primary objective that is considered for this process is the efficiency of the process, modeled as the percentage of candidates who are successfully hired. A secondary goal is the time and cost required to complete the hiring process cycle. The process 500' is supported by two resources: the HR staff, and the IT infrastructure, broadly modeled. The availability and experience of the HR staff, and the availability of the IT infrastructure, contribute to the efficiency of the process execution. HR staff availability is affected by environmental factors of socio-political stability (which is simply modeled as being in a "stable" or "unstable" state), transportation gridlock ("occurs" or "does not occur"), and the risk event that the HR attrition is high. The likelihood that the HR attrition is high is affected by the competitiveness of HR salaries. Socio-political stability affects the likelihood that transportation gridlock will occur. In addition, the probability that a given job applicant will accept the offer depends on the environmental factor of the competitiveness of the offer.

In this setting, several risk mitigation actions can be considered. For instance, investments in redundant servers would lead to an increase in IT resource availability, specifically decreasing the probability of having unavailable servers. Another alternative to increase the performance of this process is to increase the quality of the inputs (i.e., candidates) represented by the applicant desirability factor. This can be achieved by relying on external hiring agencies which pre-screen candidates (although for a fee). Finally, an increase in HR salaries would affect the competitiveness of HR salaries thereby indirectly reducing HR attrition.

Figure 15:
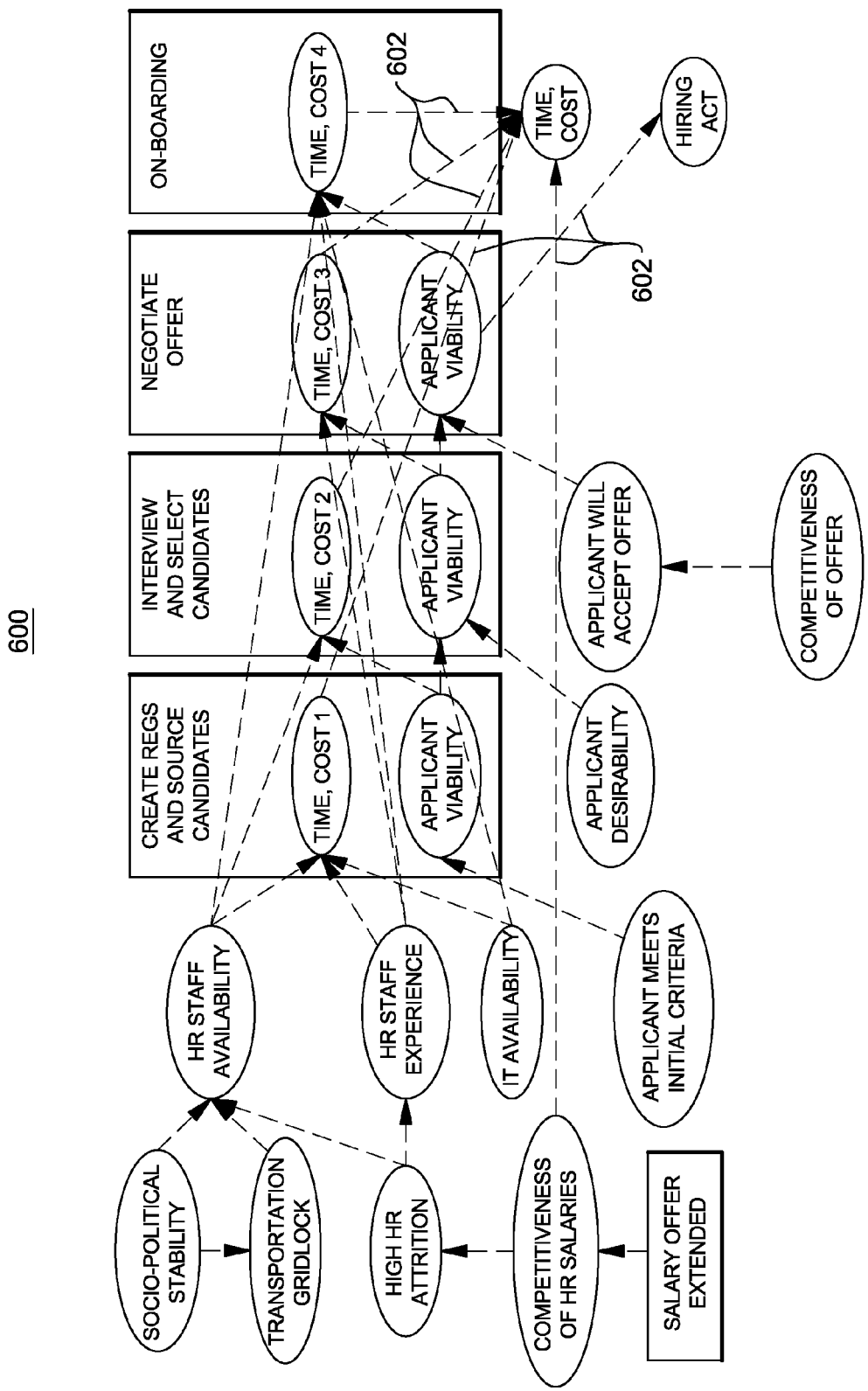
FIG. 15 illustrates an example Bayesian network graphical representation for computing the performance measures derived from the representation of the process depicted in FIG. 13 in an example application of the invention; and, FIG. 16 shows a computer system, which may be used to implement the present invention.

As shown in FIG. 15, a Bayesian network graphical representation 600 for computing the performance measures Airing percentage, time, cost) may be derived from the level-one diagram as described herein. Note that each activity in the hiring process is associated with a set of nodes which track the performance metrics of time, cost, and applicant viability (which tracks the state of the hiring process). It is noted that all the state variables of the environmental factors and the job are translated into nodes of this network. The final two nodes represent the overall performance metrics for the process, which aggregate the performance metrics for the individual activities.

Figure 16:
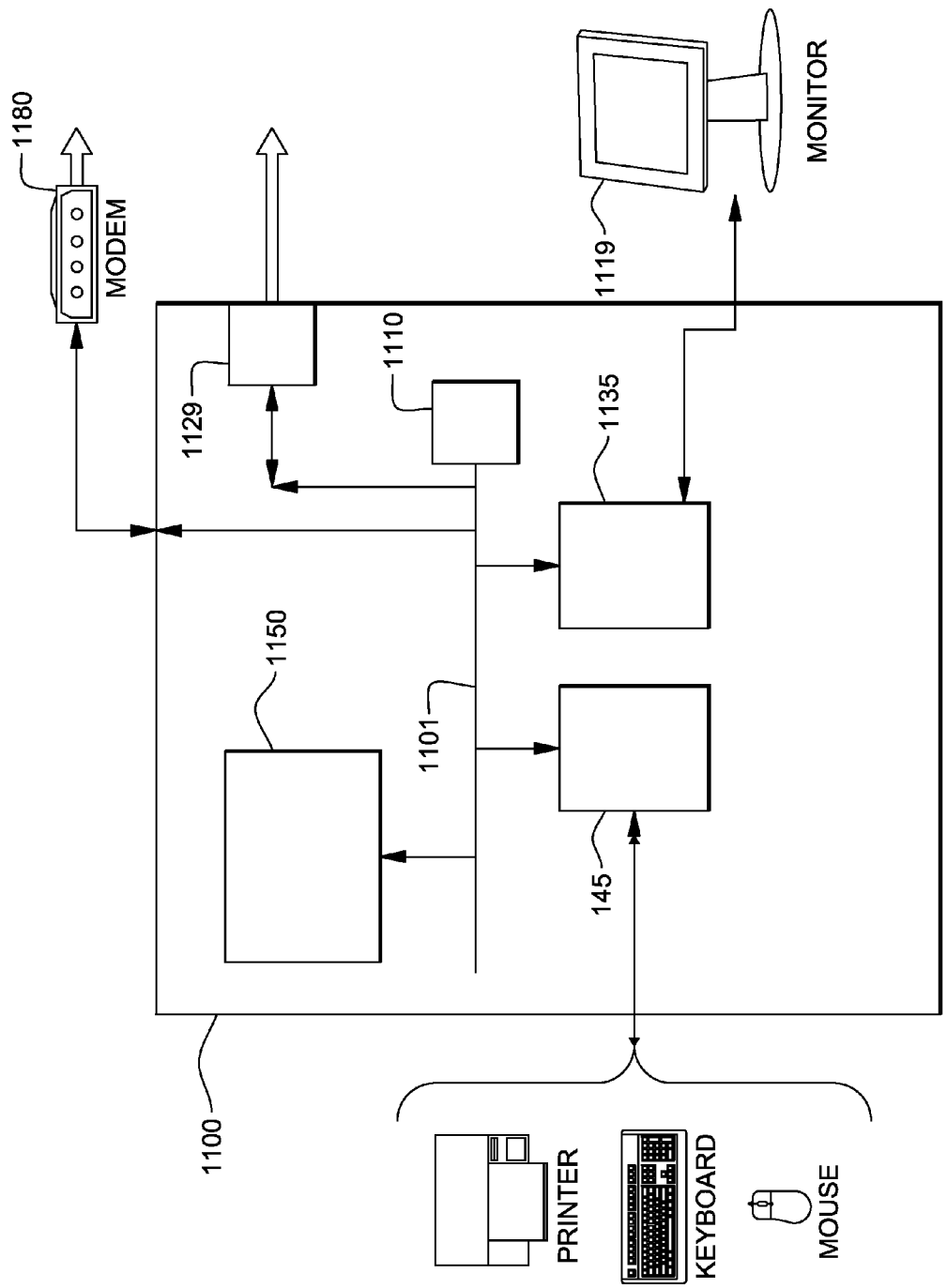

In the example Bayes net shown in FIG. 16, the interconnection lines 602 represent a conditional dependence relation between the state of a child node and the state of its parent node(s). Essentially, the probability distribution of the state of the child node is fully determined by the states of the parent nodes. As shown in FIG. 16, the nodes here represent the states of resources, jobs, environmental factors, etc., at each stage of the process (after the completion of each activity). The "activity functions" described above determine the probability distributions of the output states (child nodes) given the values of the input states (parent nodes).

The Extended BPMN Process Execution Engine implementing the method of the present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded into a computer system, is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention.

Furthermore, the present invention may be implemented as a program storage device readable by machine, tangibly embodying a program of instructions executable by the machine to perform method steps for causing one or more functions of this invention.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

More specifically, as shown in FIG. 16, a computer system 1000, includes one or more processors or processing units 1110, a system memory 1150, and an address/data bus structure 1101 that connects various system components together. For instance, the bus 1101 connects the processor 1110 to the system memory 1150. The bus 1101 can be implemented using any kind of bus structure or combination of bus structures, including a memory bus or memory controller, a peripheral bus, an accelerated graphics port, and a processor or local bus using any of a variety of bus architectures such as ISA bus, an Enhanced ISA (EISA) bus, and a Peripheral Component Interconnects (PCI) bus or like bus device. Additionally, the computer system 1100 includes one or more monitors 1119 and, operator input devices such as a keyboard, and a pointing device (e.g., a "mouse") for entering commands and information into computer, data storage devices, and implements an operating system such as Linux, various Unix, Macintosh, MS Windows OS, or others.

The computing system 1100 additionally includes: computer readable media, including a variety of types of volatile and non-volatile media, each of which can be removable or non-removable. For example, system memory 1150 includes computer readable media in the form of volatile memory, such as random access memory (RAM), and non-volatile memory, such as read only memory (ROM). The ROM may include an input/output system (BIOS) that contains the basic routines that help to transfer information between elements within computer device 1100, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus 1101 by one or more data media interfaces (not shown). Alternatively, the hard disk drive, magnetic disk drive, and optical disk drive can be connected to the system bus 1101 by a SCSI interface (not shown), or other coupling mechanism. Although not shown, the computer 1100 can include other types of computer readable media. Generally, the above-identified computer readable media provide non-volatile storage of computer readable instructions, data structures, program modules, and other data for use by computer 1100. For instance, the readable media can store an operating system (O/S), one or more application programs, and/or other program modules and program data for enabling risk-extended business process model generation and display via Graphical User Interface (GUI).

Input/output interfaces 1145 are provided that couple the input devices to the processing unit 110. More generally, input devices can be coupled to the computer 1100 through any kind of interface and bus structures, such as a parallel port, serial port, universal serial bus (USB) port, etc. The computer environment 1100 also includes the display device 1119 and a video adapter card 1135 that couples the display device 1119 to the bus 1101. In addition to the display device 1119, the computer environment 1100 can include other output peripheral devices, such as speakers (not shown), a printer, etc. I/O interfaces 1145 are used to couple these other output devices to the computer 1100.

As mentioned, computer system 1100 is adapted to operate in a networked environment using logical connections to one or more computers, such as the server device that may include all of the features discussed above with respect to computer device 100, or some subset thereof. It is understood that any type of network can be used to couple the computer system 1100 with server device 120, such as a local area network (LAN), or a wide area network (WAN) (such as the Internet). When implemented in a LAN networking environment, the computer 1100 connects to local network via a network interface or adapter 1129. When implemented in a WAN networking environment, the computer 1100 connects to the WAN via a high speed cable/dsl modem 180 or some other connection means. The cable/dsl modem 1180 can be located internal or external to computer 1100, and can be connected to the bus 1101 via the I/O interfaces 1145 or other appropriate coupling mechanism. Although not illustrated, the computing environment 1100 can provide wireless communication functionality for connecting computer 1100 with remote computing device, e.g., an application server 1120 (e.g., via modulated radio signals, modulated infrared signals, etc.).

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

While it is apparent that the invention herein disclosed is well calculated to fulfill the advantages stated above, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new, and desire to secure by Letters Patent is:

1. A method for representing operational risk information in a business process model, said method comprising:

specifying, at a computer device, first data defining a job type that is to be processed in a business process model, said job type having associated job attributes specifying for determining an order of activities to be performed;

receiving, at said computer device, second data for said job type, said second data specifying one or more resources and associated functions of resources that support activity execution and one or more preconditions to be fulfilled by the resources performing said functions, said second data for said job type further comprising a defined set of performance measures related to activity execution and to job output quality, said job output quality including job quality states defined according to different levels of quality;

receiving, at said computer device, third data defining a set of risk events that potentially compromise said performance measures, a risk event having assigned one or more attributes specifying risk event frequency and severity level, said set of risk events being linked to one or more resources;

receiving, at said computer device, fourth data specifying one or more preconditions for said activities in terms of requirements to be fulfilled to begin activity execution;

providing a function for each activity that maps a state of a resource, job, external factor, as well as an occurrence or non-occurrence of one or more errors, to output states of said resources and jobs and to said activity execution performance measures; and, generating, at said computer device, a risk-extended business model extended to incorporate said first, second third and fourth data using said activity mapping function, said business model including a representation and impact of operational risk, wherein an activity of a job type relates to a plurality of components including a corresponding precondition component having said specified preconditions, an execution component, a remediation component, and said job type activity being influenced by procedural errors and execution errors;

wherein for an activity of a job type, said risk-extended business model including verifying that one or more preconditions are fulfilled, and executing the activity upon said verification, where the executing activity outcome is influenced by execution failure events, states of a data object representing a job, supporting resources, and environmental factors; and, if the preconditions are not met, said risk-extended business model specifying delaying or canceling the activity, or performing remedial steps in order to ensure that activity execution can begin, wherein a detected precondition error links to a separate set of defined preconditions; and every violation of a precondition set links to a remediation action; and every execution error links to a different execution of the activity, wherein a programmed processor unit of said computer device performs said job type specifying, said retrieving first, second, third and fourth data, and said generating.

2. The method for representing operational risk information as claimed in claim 1, wherein, said second data further includes, for each job type, a specification of variants of said job type activities or executions thereof, said second data including a correlation of available resources to said activity or execution variants.

3. The method for representing operational risk information as claimed in claim 2, wherein said second data further includes data specifying failure modes of each said one or more resources for each said job types and specified variants thereof.

4. The method for representing operational risk information as claimed in claim 3, wherein said second data further specifies indicators of vulnerabilities to risk events.

5. The method for representing operational risk information as claimed in claim 3, wherein said fourth data further comprises: specified external factors that must be satisfied in order to begin activity execution, said external factors including environmental factors.

6. The method for representing operational risk information as claimed in claim 5, wherein said second data further comprises refined preconditions for activities in terms of the failure modes of each resource and refined risk events based on resource failure modes and said environmental factors.

7. The method for representing operational risk information as claimed in claim 1, further comprising:
 providing a function for each activity that maps a precondition to a postcondition, said postcondition including a state of said job, a state of the supporting resources, and an evaluation of execution-related performance measures.

8. The method for representing operational risk information as claimed in claim 1, wherein said execution-related performance measures comprise job time and job cost.

9. The method for representing operational risk information as claimed in claim 1, wherein said execution errors result when a desired outcome of tasks comprising activity execution are not met due to failures, said method further comprising:
 identifying execution errors for activities; and,
 correlating said execution errors with said preconditions.

10. The method for representing operational risk information as claimed in claim 1, wherein said procedural errors result when said order of activities to be performed are not followed or any preconditions for activity execution are ignored.

11. The method for representing operational risk information as claimed in claim 1, wherein said one or more errors comprises: precondition violations, in which tasks comprising activity execution cannot begin due to compromised resources or other preconditions.

12. The method for representing operational risk information as claimed in claim 1, further comprising: providing one or more association rules between risk event and attributes of said resources, said rules specifying one or more mitigation actions that result in a change in the attributes of resources, jobs, and activities.

13. The method for representing operational risk information as claimed in claim 5, wherein said second data further comprises:
 defined state changes and inspection events for each resource, job type, and environmental factor, wherein, for each failure mode of each resource, a state change is defined that leads to that failure mode.

* * * * *